US011612888B2

(12) United States Patent
Pentyala et al.

(10) Patent No.: US 11,612,888 B2
(45) Date of Patent: Mar. 28, 2023

(54) BIOMARKER DETECTION DEVICE

(71) Applicant: THE RESEARCH FOUNDATION FOR THE STATE UNIVERSITY OF NEW YORK, Albany, NY (US)

(72) Inventors: Srinivas Pentyala, Albany, NY (US); Sahana Pentyala, Albany, NY (US)

(73) Assignee: The Research Foundation for The State University of New York, Albany, NY (US)

(*) Notice: Subject to any disclaimer, the term of this patent is extended or adjusted under 35 U.S.C. 154(b) by 583 days.

(21) Appl. No.: 16/475,754

(22) PCT Filed: Jan. 3, 2018

(86) PCT No.: PCT/US2018/012201
§ 371 (c)(1),
(2) Date: Jul. 3, 2019

(87) PCT Pub. No.: WO2018/129056
PCT Pub. Date: Jul. 12, 2018

(65) Prior Publication Data
US 2019/0329242 A1   Oct. 31, 2019

Related U.S. Application Data

(60) Provisional application No. 62/442,235, filed on Jan. 4, 2017.

(51) Int. Cl.
*B01L 3/00* (2006.01)
*B01D 63/08* (2006.01)
(Continued)

(52) U.S. Cl.
CPC .......... *B01L 3/5023* (2013.01); *B01D 63/087* (2013.01); *B01D 71/021* (2013.01);
(Continued)

(58) Field of Classification Search
None
See application file for complete search history.

(56) References Cited

U.S. PATENT DOCUMENTS 4,757,022 A   7/1988 Shults et al.
4,769,145 A   9/1988 Nakajima
(Continued)

FOREIGN PATENT DOCUMENTS

CN   106132456 B   12/2019
CN   110785649 A   2/2020
(Continued)

OTHER PUBLICATIONS

International Search Report dated Mar. 26, 2018 issued in PCT/US2018/12201.
(Continued)

*Primary Examiner* — Lore R Jarrett
(74) *Attorney, Agent, or Firm* — Scully, Scott, Murphy & Presser, P.C.

(57) ABSTRACT

The disclosure is directed to a device that includes an upper container configured to receive a fluid sample collected from a mammal into a first opening, the first opening opposite a second opening and a membrane covering at least a portion of the second opening, the membrane configured to allow transmission of a portion of the fluid sample through the membrane.

26 Claims, 23 Drawing Sheets

(51) Int. Cl.
  *B01D 71/02* (2006.01)
  *B01D 71/10* (2006.01)
  *B01D 71/34* (2006.01)
  *G01N 1/34* (2006.01)
  *G01N 1/40* (2006.01)

(52) U.S. Cl.
  CPC .............. *B01D 71/10* (2013.01); *B01D 71/34* (2013.01); *G01N 1/34* (2013.01); *G01N 1/40* (2013.01); *B01D 2313/025* (2013.01); *G01N 2001/4016* (2013.01); *G01N 2001/4088* (2013.01)

(56) References Cited

U.S. PATENT DOCUMENTS

| | | | |
|---|---|---|---|
| 4,812,293 | A | 3/1989 | McLaurin et al. |
| 4,912,034 | A | 3/1990 | Kalra et al. |
| 5,133,363 | A | 7/1992 | Guirguis |
| 5,169,789 | A | 12/1992 | Bernstein |
| 5,185,127 | A | 2/1993 | Vonk |
| 5,358,690 | A | 10/1994 | Guirguis |
| 5,792,425 | A | 8/1998 | Clark et al. |
| 6,140,136 | A | 10/2000 | Lee |
| 6,741,877 | B1 | 5/2004 | Shults et al. |
| 6,978,688 | B2 | 12/2005 | Engebretson |
| 7,071,001 | B2 * | 7/2006 | Brubaker ............ G01N 33/4905 436/63 |
| 7,270,959 | B2 | 9/2007 | Hudak |
| 7,300,633 | B2 | 11/2007 | Hudak et al. |
| 7,357,042 | B2 | 4/2008 | Tenney |
| 7,488,450 | B2 | 2/2009 | Matusewicz et al. |
| 7,625,763 | B2 | 12/2009 | Panotopoulos |
| 7,741,103 | B2 | 6/2010 | Guirguis |
| 7,892,493 | B2 | 2/2011 | Weekamp |
| 8,012,770 | B2 * | 9/2011 | Siciliano ........... G01N 33/56911 436/805 |
| 8,246,832 | B2 | 8/2012 | Lomas et al. |
| 8,318,413 | B2 | 11/2012 | Woodbury et al. |
| 8,377,379 | B2 | 2/2013 | Feaster et al. |
| 8,399,006 | B2 | 3/2013 | de Juan, Jr. et al. |
| 8,889,427 | B2 | 11/2014 | Altschul et al. |
| 9,079,181 | B2 | 7/2015 | Curry et al. |
| 9,113,850 | B2 | 8/2015 | Skakoon |
| 9,151,754 | B2 | 10/2015 | Snowden et al. |
| 9,808,798 | B2 | 11/2017 | Ismagilov et al. |
| 9,822,356 | B2 | 11/2017 | Ismagilov et al. |
| 9,908,113 | B2 | 3/2018 | Sloan et al. |
| 10,179,332 | B2 | 1/2019 | Cotton |
| 10,188,335 | B2 | 1/2019 | Haghgooie et al. |
| 10,265,215 | B2 | 4/2019 | de Juan, Jr. et al. |
| 10,533,932 | B2 | 1/2020 | Guldberg et al. |
| 10,564,155 | B2 | 2/2020 | Guirguis |
| 10,588,608 | B2 | 3/2020 | Jones et al. |
| 10,638,963 | B2 | 5/2020 | Beyerlein et al. |
| 10,690,654 | B2 | 6/2020 | Murray et al. |
| 10,857,268 | B2 | 12/2020 | Robinson et al. |
| 10,864,483 | B2 | 12/2020 | Compton et al. |
| 11,007,527 | B2 | 5/2021 | Sloan et al. |
| 11,326,992 | B2 | 5/2022 | Henion et al. |
| 2008/0290040 | A1 | 11/2008 | Kane et al. |
| 2009/0042214 | A1 * | 2/2009 | Cooke ................ G01N 33/6893 435/7.1 |
| 2011/0195872 | A1 | 8/2011 | Selinfreund et al. |
| 2011/0236913 | A1 | 9/2011 | Baek et al. |
| 2012/0329163 | A1 | 12/2012 | Faber et al. |
| 2013/0273528 | A1 | 10/2013 | Ehrenkranz |
| 2014/0227772 | A1 | 8/2014 | Guzman |
| 2015/0011412 | A1 * | 1/2015 | Deirmengian ....... G01N 33/5748 435/6.12 |
| 2015/0072346 | A1 | 3/2015 | Gellibolian et al. |
| 2015/0192581 | A1 | 7/2015 | Marr et al. |
| 2015/0219664 | A1 * | 8/2015 | Landi .................... A61K 45/00 702/19 |
| 2015/0247178 | A1 | 9/2015 | Mountcastle et al. |
| 2015/0314285 | A1 | 11/2015 | Cotton |
| 2016/0161502 | A1 | 6/2016 | Duffin et al. |

FOREIGN PATENT DOCUMENTS

| | | | |
|---|---|---|---|
| CN | 111032198 A | 4/2020 | |
| CN | 111065446 A | 4/2020 | |
| CN | 111432726 A | 7/2020 | |
| CN | 112371195 A | 2/2021 | |
| CN | 112996598 A | 6/2021 | |
| CN | 114207448 A | 3/2022 | |
| EP | 0 414 513 A2 | 2/1991 | |
| EP | 0440350 B1 * | 8/1997 | ............ G01N 33/543 |
| EP | 3 489 651 A1 | 5/2019 | |
| EP | 3 154 696 B1 | 4/2020 | |
| EP | 3 043 718 B1 | 6/2020 | |
| EP | 3 967 242 A1 | 3/2022 | |
| JP | 1891317 B2 | 12/2011 | |
| JP | 2019-508706 A | 3/2019 | |
| JP | 2022-535300 A | 8/2022 | |
| KR | 10-2014-0040239 A | 4/2014 | |
| WO | 2012/154905 A1 | 11/2012 | |
| WO | 2021/188594 A1 | 9/2021 | |
| WO | 2021/195633 A1 | 9/2021 | |
| WO | 2021/222866 A1 | 11/2021 | |
| WO | 2022/072876 A1 | 4/2022 | |

OTHER PUBLICATIONS

Liu W. et al., "Laminated Paper-Based Analytical Devices (LPAD) With Origami-Enabled Chemiluminescence Immunoassay for Cotinine Detection in Mouse Serum", Anal. Chem. 85:10270-10276 (2013).
Pauli G E N et al., "Lab-in-a-Syringe Using Gold Nanoparticles for Rapid Immunosensing of Protein Biomarkers", Lab Chip 15:399-405 (2015).
Pentyala S. et al., "A Novel Point-of-Care Biomarker Recognition Method: Validation by Detecting Marker for Diabetic Nephropathy", Diagnostics 5:177-188 (2015).
Vaidya V.S. et al., "A Rapid Urine Test for Early Detection of Kidney Injury", Kidney Inst. 76(1):108-114 (Jul. 2009).
Warren A.D. et al., "Point-of-Care Diagnostics for Noncommunicable Diseases Using Synthetic Urinary Biomarkers and Papers Microfluidics", PNAS 111(10):3671-3676 (Mar. 11, 2014).

\* cited by examiner

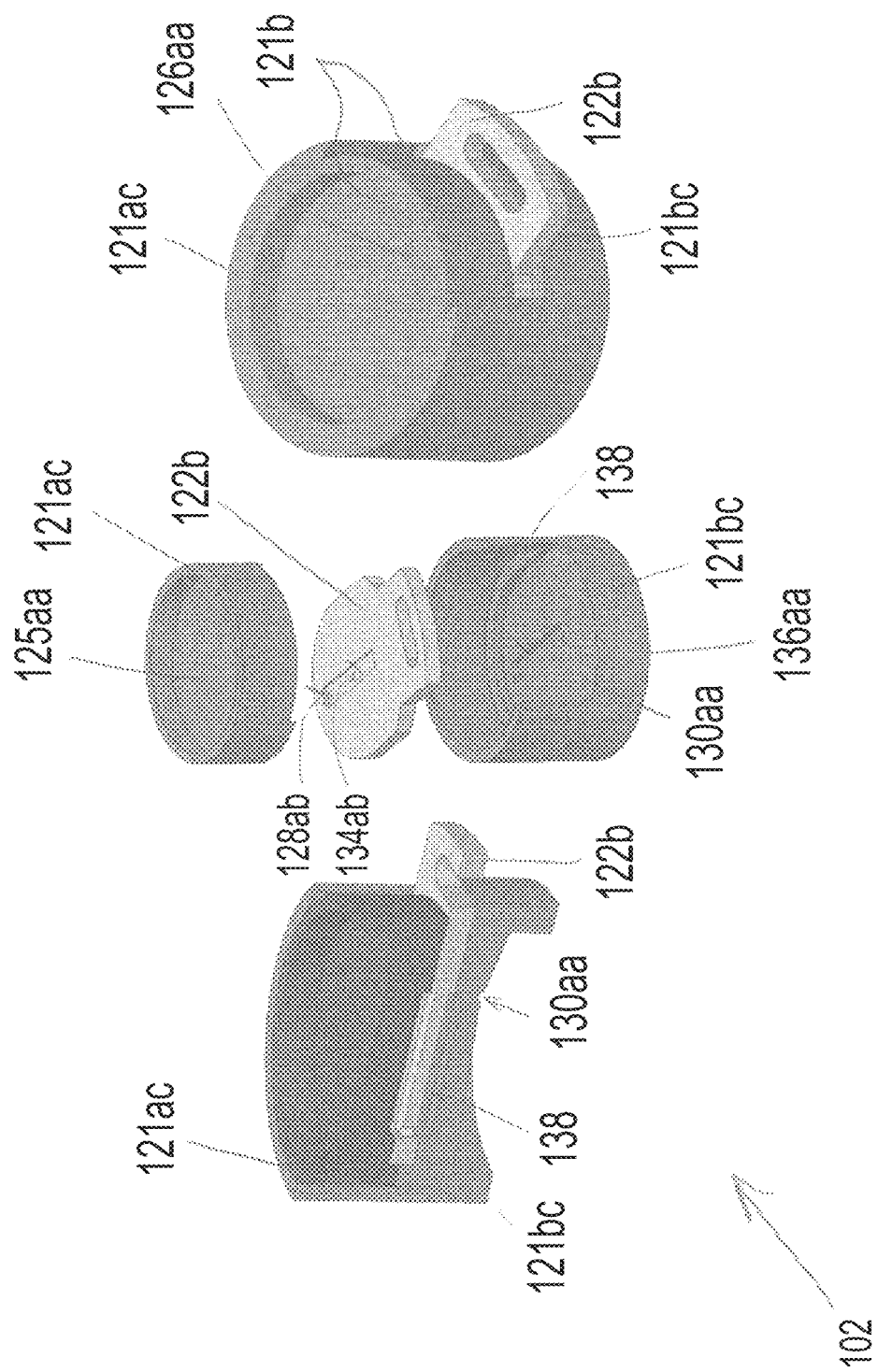

Urine proteins differentially expressed in type 2 diabetic patients with macroalbuminuria compared with type 2 diabetes without albuminuria

| Swiss-Prot accession no. | Protein name | -Fold change |
|---|---|---|
| P04217 | $\alpha_{1B}$-Glycoprotein | 6.95 |
| P25311 | $\alpha_2$-Glycoprotein 1, zinc | 5.86 |
| P02774 | Vitamin D-binding protein | 4.84 |
| P02765 | $\alpha_2$-HS-glycoprotein | 4.71 |
| P06702 | Calgranulin B | 3.87 |
| P01009 | $\alpha_1$-Antitrypsin | 2.89 |
| P02790 | Hemopexin | 2.39 |
| P02753 | Plasma RBP | -1.52 |
| P02760 | AMBP protein | -1.61 |
| P02647 | ApoA-1 | -3.20 |
| P02766 | Transthyretin | -4.32 |

FIG. 21

| Cancer | Potential Biomarkers | Comment (Reference) |
|---|---|---|
| Bladder | Bladder-tumor-associated antigen | FDA-Approved Immunoassay (4) |
| | NMP22 | FDA-Approved Immunoassay (5) |
| | Calreticulin | Partially Validated via Western Blot (15) |
| | Clusterin | Diagnostic/Prognostic (13) |
| | Cystatin B | Partially Validated via IHC and Western Blot (11) |
| | Proepithelin | Partially validated via IHC and ELISA (18) |
| | UHRF1 | Observed via IHC (22) |
| | α-1B-Glycoprotein | Discovered using Lectin Affinity Chromatography (17) |
| Renal | Cathepsin D | Correlated with Survival (8) |
| | NMP22 | FDA-Approved for Bladder Cancer (16) |
| Prostate | Collagen α-1(III) peptideCollagen α-1(I) peptide | MMP Substrate (21) |
| | Psoriasis susceptibility 1 candidate gene 2 protein peptide | CE-MS Detection, Decreased in Cancer (21) |
| | Sodium / potassium-transporting ATPase γ Peptide | CE-MS Detection (21) |
| | PCA3 | mRNA Detection in Urine (14) |
| Ovarian | Eosinophil-derived Neurotoxin C-terminal Osteopontin fragments | Glycosylated Fragment (62) |
| | Bcl-2 | ELISA (9) |
| Breast | MMP9 | Detected by Zymography (56) |
| | ADAM12 | Detected by Western Blot (56) |
| Colorectal | Cystatin SN | Tissue IHC and RT-PCR; ELISA with Urinary Protein (23) |
| Multiple Myeloma | IL6, MMP9 | Index for Bone Disease (19) |
| | Antibodies | Diagnostic/Prognostic (10, 12, 20) |

FIG. 22

Replacement Sheet

| Disease | Method | No. of patients | No. of controls | Potential biomarkers | | Ref. |
|---------|--------|-----------------|-----------------|----------------------|---|------|
|         |        |                 |                 | Upregulated | Downregulated | |
| MDD | MALDI-TOF MS-based peptidomics | 66 | 41 | Serum albumin, apolipoprotein A-I, HSPG | Protein AMBP | [22] |
|  | NMR-based metabolomics | 134 | 126 | Formate, alanine | Malonate, N-methylnicotinamide, m-hydroxyphenylacetate | [25] |
|  | GC-MS-based metabolomics | 134 | 126 | Sorbitol, uric acid, azelaic acid | Hippuric acid, quinolinic acid, tyrosine | [26] |
| BD | NMR and GC-MS-based metabolomics | 71 | 126 | Azelaic acid, β-alanine, α-hydroxybutyrate | Pseudouridine, 2,4-dihydroxypyrimidine | [29] |
|  | GC-MS-based metabolomics | 71 | 94 |  | 2,4-Dihydroxypyrimidine | [30] |
|  | NMR-based metabolomics | 86 | 98 | α-Hydroxybutyrate, isobutyrate | Choline, N-methylnicotinamide | [33] |
|  | NMR-based metabolomics | 42 male | 53 male | α-Hydroxybutyrate, formate | Choline, N-methylnicotinamide | [34] |
|  | NMR-based metabolomics | 44 female | 43 female | α-Hydroxybutyrate | Oxalacetate, acetone, N-methylnicotinamide | [34] |
| ASD | NMR-based metabolomics | 39 | 62 |  | N-methyl-2-pyridone-5-carboxamide, N-methyl nicotinic acid, taurine, N-methyl nicotinamide | Glutamate | [36] |
|  | NMR-based metabolomics | 21 | 21 | 3-(3-Hydroxyphenyl)-3-hydroxypropanoic, 3,4-dihydroxybutyric acid, glycolic acid, glycine, cis-aconitic acid | Fructose, 1,2,3-butanetriol, propylene glycol | [38] |
|  | GC-MS-based metabolomics | 14 | 10 | Oxalic acid, β-hydroxybutyric acid, ribonic acid, m-hydroxybenzoic acid | Phosphoric acid, sebacic acid | [43] |
| Schizophrenia | MS/MS, UPLC-MS and NMR-based metabolomics | 11 | 11 | Uric acid, pregnanediol, valine, glycine, glucose | Creatinine, hippurate, creatine, citrate, α-KG, taurine, TMAO | [43] |
|  | GC-TOF and NMR-based metabolomics | 112 | 120 | β-Hydroxybutyrate |  | [44] |

FIG. 23

| Disease | Method Upregulated Downregulated | Species | No. of subjects | No. of controls | Potential biomarkers | Ref. |
|---|---|---|---|---|---|---|
| Stroke | 2-DE-based proteomics | Rat | 8 stroke-prone spontaneously-hypertensive rats | 5 Wistar-Kyoto rats 5 spontaneously hypertensive rats | Transferrin, hemopexin, albumin, transthyretin, α2-HS-glycoprotein, Gc-globulin, α1-antitrypsin, kallikrein-binding protein | [48] |
| | CE-MS-based proteomics | Human | 101 | 48 | Classifiers contains 14 biomarkers or 35 biomarkers | [39] |
| | NMR-based metabolomics | Human | 28 | 30 | Citrate, dimethylamine, creatinine, glycine, hippurate | [30] |
| AD | NMR-based metabolomics | Mouse | 3-5 each for 4, 10, 15 months | 3-5 | 3-Hydroxykynurenine, homogentisate, allantoin | Dimethylamine, trimethylamine | [54] |
| | LC-MS-based metabolomics | Mouse | 12 | 12 | Methionine, desaminotyrosine | N1-acetylspermidine, 5-hydroxyindoleacetic acid | [55] |
| PD | LC-MS-based metabolomics | Human | 106 | 104 | Cortisol,11-deoxycortisol, 21-deoxycortisol, histidine, urocanic acid, imidazoleacetic acid, hydroxyphenylacetic acid | [97] |
| MScl | LC-MS-based proteomics | Human | 31 | 8 | Levels of 531 peptides from MScl patients and 36 peptides from controls were altered in the third trimester compared to the postpartum period. 43 peptides are associated with MScl | [80] |
| TSEs | 2-DE-based proteomics | Cattle | 13 | 14 | 9 spots in 2-DE | [92] |
| | 2-DE and LC-MS-based proteomics | Mouse | 4 scrapie mice | 4 controls and 4 Alzheimer mice at each time point | Classifier contains 20 spots | [83] |

FIG. 24

| Class 1: 100 ng/ml ->10 ug/ml | | Class 2: 10 ng/ml -100 ng/ml | | Class 3: 1 ng/ml -10 ng/ml | | Class 4: Non-standard units | |
|---|---|---|---|---|---|---|---|
| Biomarker | Protein Family | Biomarker | Protein Family | Biomarker | Protein Family | Biomarker | Protein Family |
| THP | glycoprotein | IGFBP-7 | growth modulator | Transthyretin | carrier protein | FSH | hormone |
| HSA | plasma Protein | HE4 | glycoprotein | Kallikrein 10 | serine protease | LH | hormone |
| SCC | glycoprotein | PSA | serine protease | Apolipoprotein AII | apolipoprotein | CA 15-3 | cancer antigen |
| OPN | cytokine | EGF | growth factor | Apolipoprotein E | apolipoprotein | CA-125 | cancer antigen |
| Calbindin | calcium binding | MPO | peroxidase | NSE | enolase | CA 19-9 | cancer antigen |
| Clusterin | glycoprotein | Cystatin C | Protease Inhibitor | M-CSF | cytokine | | |
| Mammaglobin | glycoprotein | β2-Microglobulin | MHC-1 component | TIMP-2 | MMP inhibitor | | |
| α1-Amitrypsin | protease Inhibitor | IGFBP-3 | growth modulator | Fibronectin | extracellular matrix | | |
| | | fPSA | protease | ANGPTL4 | glycoprotein | | |
| | | Thrombospondin | Anti-angiogenesis | GSTα | enzyme | | |
| | | LOX-1 | membrane receptor | sTNFRII | secreted receptor | | |
| | | GST π | enzyme | MMP-8 | MMP | | |
| | | TFF-3 | gut secretion | Complement C3 | complement | | |
| | | C-Peptide | peptide | CEA | glycoprotein | | |
| | | Thrombomodulin | receptor | sICAM-1 | adhesion molecule | | |
| | | MDA-LDL | lipoprotein | Keratin-i,10,11 | structural protein | | |
| | | Adiponectin | hormone | Cortisol | hormone (steroid) | | |
| | | Cathepsin D | protease | Angiogenin | ribonuclease | | |
| | | Apolipoprotein A1 | apolipoprotein | Complement H | complement | | |
| | | α-2-Macroglobulin | plasma Protein | Involucrin | envelope protein | | |
| | | | | Apolipoprotein B | apolipoprotein | | |
| | | | | sgp130 | cytokine | | |
| | | | | MMP-7 | MMP | | |
| | | | | MMP-9 | MMP | | |
| | | | | H-FABP | growth inhibitor | | |
| | | | | sVCAM-1 | adhesion molecule | | |
| | | | | PBEF | enzyme | | |
| | | | | Complement C4 | complement | | |
| | | | | Keratin-6 | structural protein | | |
| | | | | sTNFRI | secreted receptor | | |
| | | | | Cytokeratin 19 | intermediate filament | | |
| | | | | Endostatin | extracellular signalling | | |
| | | | | OC | hormone | | |
| | | | | NCAM | adhesion molecule | | |

Biomarkers within each class listed in order of decreasing relative abundance; Biomarkers in bold indicate high molecular weight (>70 kDa).
doi:10.1371/journal.pone.0063368.t002

FIG. 25

| Swiss-Prot/TrEMBL Accession No. | Protein name | MW (kDa) |
|---|---|---|
| P01009 | $\alpha_1$-Antitrypsin | 46,707 |
| P02787 | Serotransferrin precursor | 77,000 |
| P00450 | Ceruloplasmin precursor | 122,128 |
| P02790 | Hemopexin | 51,643 |
| P02760 | AMBP protein | 38,974 |
| P08603 | Complement factor H | 139,034 |
| Q56G89 | Serum albumin | 71,658 |
| P01011 | $\alpha_1$-Antichymotrypsin precursor | 47,651 |
| P01008 | Antithrombin-III | 52,658 |
| P01024 | Complement component C3 | 187,046 |
| P02647 | ApoA-1 | 30,759 |
| P25311 | $\alpha_2$-Glycoprotein 1, zinc | 34,223 |
| P01857 | Ig γ-1 chain C region | 51,628 |
| P01042 | Kininogen precursor | 47,853 |
| Q5JP68 | B-factor, properdin | 68,829 |
| P04217 | $\alpha_{1B}$-Glycoprotein | 54,239 |
| P06727 | ApoA-IV | 45,343 |
| P00737 | Haptoglobin precursor | 31,362 |
| P10909 | Clusterin | 52,461 |
| P02749 | $\beta_2$-Glycoprotein 1 precursor | 38,273 |
| P00751 | Complement factor B | 85,479 |
| P05156 | Complement factor I | 65,677 |
| P10643 | Complement component C7 | 93,457 |
| Q8IZY7 | Hepatocellular carcinoma associated protein TB6 | 83,232 |
| Q6LDQ3 | Sulfated glycoprotein 2 | 57,796 |
| P01019 | Angiotensinogen | 53,121 |
| P02750 | Leucine-rich $\alpha_2$-glycoprotein | 38,154 |
| P02766 | Transthyretin precursor | 15,877 |
| P02765 | $\alpha_2$-HS-glycoprotein precursor | 39,300 |
| P41222 | Prostaglandin H$_2$ D-isomerase precursor | 21,015 |
| P06702 | Calgranulin B | 13,234 |
| P02748 | Complement component 9 precursor | 63,133 |

FIG. 26

| Swiss-Prot/TrEMBL Accession No. | Protein name | MW (kDa) |
|---|---|---|
| P01876 | Ig α-1 chain C region | 53,163 |
| Q14624 | Inter-α-trypsin inhibitor heavy chain h4 precursor | 101,179 |
| P02753 | Plasma retinol-binding protein precursor | 22,995 |
| Q12805 | Epidermal growth factor–containing fibulin-like extracellular matrix protein | 54,517 |
| IPI00061246 | Hypothetical protein | 52,553 |
| IPI00178198 | Predicted immunoglobulin | 23,530 |
| P01834 | Ig κ chain C region | 15,170 |
| P01884 | $\beta_2$-microglobulin | 13,706 |
| Q14118 | Dystroglycan precursor | 97,520 |
| IPI00181119 | Hypothetical protein | 70,309 |
| IPI00186312 | Hypothetical protein | 37,651 |
| P02774 | VDBP | 52,964 |
| Q15668 | Epididymal secretory protein E1 | 16,559 |
| IPI00151992 | Hypothetical protein FLJ31320 | 67,970 |
| P51884 | Lumican precursor | 38,405 |
| P01861 | Ig γ-4 chain C region | 35,941 |
| P08697 | $\alpha_2$-Antiplasmin precursor | 54,531 |
| P02652 | ApoA-II precursor | 11,168 |
| P02675 | Fibrinogen β chain precursor | 55,892 |
| IPI00168010 | Hypothetical protein FLJ35322 | 18,511 |
| P05090 | ApoD | 21,262 |
| P08185 | Corticosteroid-binding globulin precursor | 45,112 |
| Q5JXG3 | Novel protein | 94,331 |
| P04004 | Vitronectin precursor | 54,306 |
| P02679 | Fibrinogen γ chain | 51,479 |
| Q9H647 | Hypothetical protein FLJ22612 | 58,511 |
| P01859 | Ig γ-2 chain C region | 46,032 |
| P24592 | Insulin-like growth factor binding protein-6 | 25,306 |
| P19823 | Inter-α-trypsin inhibitor heavy chain H2 | 106,596 |
| P15144 | Membrane alanine aminopeptidase precursor | 109,312 |

FIG. 27

BIOMARKER DETECTION DEVICE

CROSS-REFERENCE TO RELATED APPLICATIONS

This application claims the benefit of U.S. Provisional Application No. 62/442,235 filed on Jan. 4, 2017, the entire contents of which is incorporated herein by reference.

FIELD OF THE DISCLOSURE

The disclosure relates generally to the field of methods and devices for detecting biomarkers. More specifically, the present disclosure is directed to methods and devices that detect biomarkers in fluid samples.

BACKGROUND OF THE INVENTION

Biological fluid collection to identify and analyze different markers of diseases and symptoms occurs in health care settings. The fluids collected are varied, including urine, blood and others.

Biomarkers, which are included in fluid samples, can be used for disease detection and monitoring. The biomarkers serve as indicators for the physiological status at a given time and change, during the disease process. The search for disease-related biomarkers for early disease detection has been to look for proteins/metabolites/molecules that are altered/secreted as a consequence of the disease process, and are shed into body fluids. After collecting these body fluids, a laborious and time-consuming process must be conducted to identify each candidate biomarker(s) from among the thousands of intact and altered molecules in the body fluids that are collected for analysis.

What is desired are methods and devices that can indicate the presence of one or more biomarkers.

Embodiments of the present application provide devices and methods that address the above and other issues.

SUMMARY OF THE INVENTION

The disclosure is directed to a device that includes an upper container configured to receive a fluid sample collected from a mammal into a first opening, the first opening opposite a second opening and a membrane covering at least a portion of the second opening, the membrane configured to allow transmission of a portion of the fluid sample through the membrane.

This disclosure is also directed to methods of using the device. These methods include providing a fluid sample to an upper container, the upper container configured to receive the fluid sample, which has been collected from a mammal, into a first opening of the upper container, the first opening opposite a second opening of the upper container. Next at least a portion of the fluid sample is transmitted through a membrane coveting at least a portion of the second opening. The portion of the fluid sample transmitted through the membrane can then enter a lower container, with the lower container and upper container attachably connected to each other by a linking member, which is configured to maintain the upper container vertically above the bottom container and is configured to maintain the membrane therein. The linking member can be comprised of an upper portion and lower portion and can be configured to maintain the membrane at any angle. The membrane can be any suitable membrane for maintaining one or more antibodies, including strips such as diagnostic strips.

BRIEF DESCRIPTION OF THE DRAWINGS

FIG. 15 is an illustration of another embodiment of a linking member of the disclosed device.

FIGS. 21, 22, 23, 24, 25, 26 and 27 are lists of biomarkers that can be detected with embodiments of the present disclosure.

DEFINITIONS

Figures 1A, 1B, 1C:
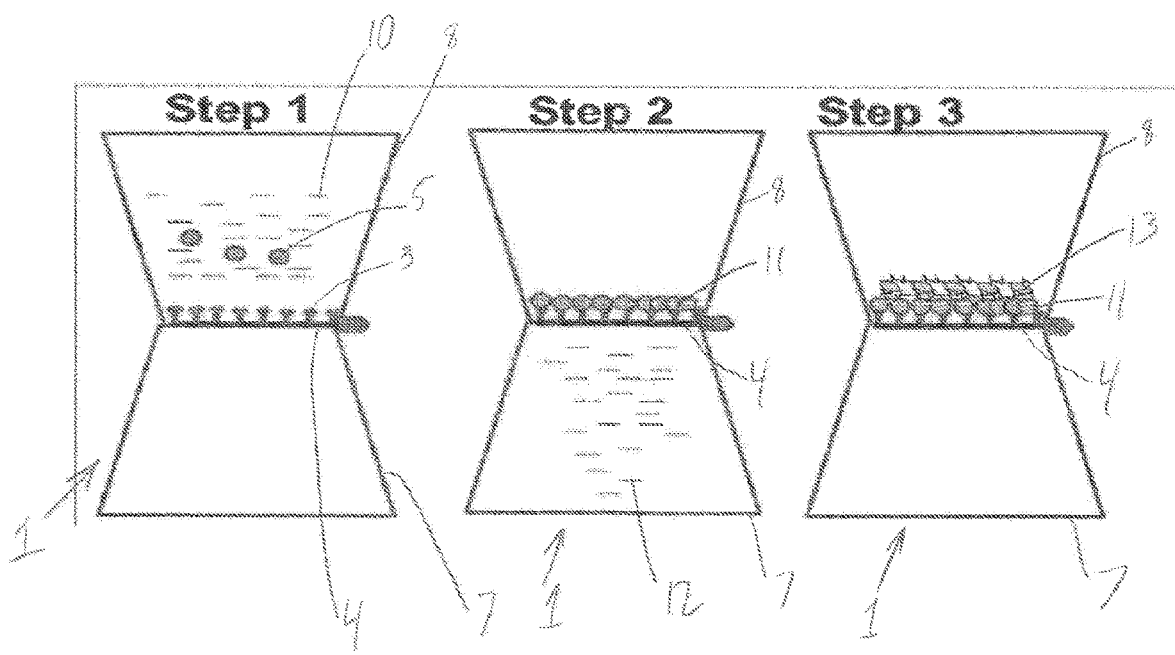
FIGS. 1A-1C are illustrations of the use of one embodiment of the disclosed device.

To facilitate the understanding of this invention a number of terms off in quotation marks in this Definitions section) are defined below. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when element is referred to as being "beneath" or "under" another element, it can be directly beneath or under the other element, or intervening elements ay be present. In contrast, when an element is referred to as being "directly beneath" or "directly under" another element, there are no intervening elements present.

As used herein, the term "substantially" or "substantial", is equally applicable when used in a negative connotation to refer to the complete or near complete lack of an action, characteristic, property, state, structure, item, or result. For example, a surface that is "substantially" flat would either be completely at, or so nearly flat that the effect would be the same as if it were completely flat.

As used herein, terms defined in the singular are intended to include those terms defined in the plural and vice versa.

As used in this specification and its appended claims, terms such as "a", "an" and "the" are not intended to refer to only a singular entity, but include the general class of which a specific example may be used for illustration, unless the context dictates otherwise. The terminology herein is used to describe specific embodiments of the invention, but their usage does not delimit the invention, except as outlined in the claims.

Unless otherwise indicated, all numbers expressing quantities of ingredients, properties such as molecular weights, reaction conditions, and so forth as used in the specification and claims are to be understood as being modified in all instances by the term "about." Accordingly, unless indicated to the contrary, the numerical parameters in the specification and claims are approximations that may vary depending upon the desired properties sought to be obtained by the present invention. At the very least, and without limiting the application of the doctrine of equivalents to the scope of the claims, each numerical parameter should at least be construed in light of the number of reported significant digits and by applying ordinary rounding techniques. Notwithstanding that the numerical ranges and parameters describing the broad scope of the invention are approximations, the numerical values in the specific examples are reported as precisely as possible. Any numerical value, however, inherently contains standard deviations that necessarily result from the errors found in the numerical value's testing measurements.

Thus, reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 5.8, 5.9, etc.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "biomarker" refers to a biomolecule, e.g., a protein or a modified, cleaved or fragmented form thereof, a nucleic acid, carbohydrate, metabolite; intermediate, etc. which is differentially present in a sample and whose presence, absence or quantity is indicative of the status of the source of the sample (e.g., cell(s), tissue(s), a mammal, etc).

As used herein, the term "antibody" means a population of immunoglobulin molecules, which can be polyclonal or monoclonal and of any isotype. As used herein, the term antibody encompasses an immunologically active fragment of an immunoglobulin molecule. Such an immunologically active fragment contains the heavy and light chain variable regions, which make up the portion of the antibody molecule that specifically binds an antigen. For example, an immunologically active fragment of an immunoglobulin molecule known in the art as Fab, Fab' or F(ab')2 is included within the meaning of the term antibody.

DETAILED DESCRIPTION

Embodiments of the present disclosure relate to devices and methods of detecting one or more biomarkers. The methods and devices in this disclosure can be operated in a point of care testing scenario. More specifically, the methods and devices in this disclosure can be operated at a site of patient care, such as a physician's office or a patient's home, and can deliver results of biomarker presence in minutes to tens of minutes. The methods and devices in this disclosure can also avoid the need for sending samples to diagnostic laboratories, which can take a long time to provide responsive results.

An overview of the disclosed devices and methods is provided below, before a more detailed discussion of the various embodiments.

The disclosure is generally directed to relatively quick biomarker detection of relatively low or trace quantities of biomarkers in a fluid, with a device configured to capture the biomarkers and provide a prognosis/diagnosis of a disease/ symptom at a collection site or some other suitable location. The use of the device has several advantages against current collection/detection methods. The device is a one-step sample collection and biomarker detection device that is used in many different health care scenarios, where fluid samples (like urine for example) are collected and sent to clinical labs for analysis.

The present device can be used as a point-of care device and can eliminate the lengthy process of transferring and analyzing the sample in specialized laboratory settings. The device can be used not only as a single-use device, but can be modified to be a multiplex as well as repeat-use device with the same sample that was collected for analysis. Thus, tests can be performed in clinics as well as by the patients themselves for diagnosing diseases and symptoms. Also, the present device can be adopted for use in any analytical (such as testing for substances of abuse), pollution control, including detection of environmental contaminants or other condition that relies on the identification of relatively low concentration substances in volumes of solutions.

The first embodiment of the device is discussed below. The first embodiment of the device for the detection of one or more biomarkers is shown in FIGS. 1A-1C. Although biomarkers can be detected by the disclosed devices and methods, the devices and methods could be modified accordingly to detect substances of abuse, analytes and markers in suitable liquids.

A device 1 for detecting one or more biomarkers includes a membrane 4 and an upper container 8. Membrane 4 includes one or more first antibodies 3, which are bound to the membrane in any suitable way, such as by adsorption, absorption or otherwise being adhered to membrane 4, the one of more first antibodies being capable of binding to one or more biomarkers 5 to form a complex. For illustration purposes the figures in this application include illustrations of biomarkers and antibodies that are quite larger than they appear in practice. These illustrations of the biomarkers and antibodies are not to scale and are for ease of explanation. The biomarker or biomarkers to be detected in the present devices and methods can be any suitable biomarker, including biomarkers that are indicative of a specific disease state or physiological state.

In FIGS. 1A-1C, membrane 4 can be any material capable of antibodies being bound thereto, capable of being in contact with fluids and configured to allow at least a portion of those fluids pass through the membrane into an optional lower container 7. The membrane can be one or more of the following: cellulose based membrane such as a cellulose acetate, a regenerated cellulose membrane and/or nitrocellulose; vinyl based membrane such as polyvinylidene fluoride (PVDF); and carbon based membrane such as Perforene®, which is an about one atom thick graphene membrane manufactured by Lockheed Martin®. In each of these embodiments, membrane 4 can include a plurality of openings to allow at least a portion of the fluids to pass through the membrane 4. These openings can be of any suitable size that allows at least a portion of a fluid to pass through and at least a portion of the biomarkers 5 to not pass through. Some examples of the suitable sizes of these openings is about 0.25 nm, about 0.5 nm, about 0.75 nm, about 1 nm, about 1.5 nm, about 2 nm, about 2.5 nm, about 3 nm, about 3.5 nm, about 4 nm, about 4.5 nm, about 5 nm and greater. In some embodiments all openings of the membrane 4 are the same size, in other embodiments the size of the openings of the membrane 4 vary across the membrane 4.

Upper container 8 is capable of holding a fluid 10, and can be made of any suitable material, such as a plastic material. The fluid 10 can be a bodily fluid that contains the one or more biomarkers to be detected.

The one or more antibodies 3 are selected based on the desired use of device 1. Specifically, the one or more antibodies 3 can be selected based on the specific biomarker or biomarkers to be detected. As an example, if the biomarker to be detected is Human Chorionic Gonadotropin (HCG), the antibody 3 would be one antibody, be bound to membrane 4 and could be a monoclonal antibody against one epitope of HCG. In other embodiments, if more biomarkers were to be detected, membrane 4 could be coated with one or more antibodies that are different from antibody 3.

Fluid 10 can be any bodily fluid that is capable of containing one or more biomarkers 5 such as, but not exclusively, amniotic fluid, aqueous humour, vitreous humour, bile, blood, breast milk, cerebrospinal fluid, cerumen, chyle, chyme, endolymph, perilymph, feces, gastric acid, gastric juice, lymph, mucus, pericardial fluid, peritoneal fluid, pleural fluid, pus, rheum, saliva, sebum, semen, sputum, sweat, synovial fluid, tears, vaginal secretion, vomit, urine and combinations thereof. These fluids can be collected in any suitable way, such as with a hypodermic needle or collection upon excretion. These fluids can also be collected from any mammal, including a human.

Membrane 4 can be contacted with varying volumes of fluid 10, including from about 1 µL to about 1 L of fluid 10. In another embodiment, membrane 4 can be contacted with about 1 mL to about 100 mL of first fluid 10.

As fluid 10 contacts membrane 4, the one or more biomarkers 5 in fluid 10 contact the one or more antibodies 3, the biomarkers and antibodies bind and form a complex 11 with each other, as illustrated in FIG. 1B. To form the complex 11, the fluid 10 at least partially passes through the membrane 4 (so as to form passed through fluid 12, which can be any portion of fluid 10), so that the fluid 10 at least partially contacts one or more antibodies 3.

As an example, of a fluid 10, there are more than 365 components in normal urine. Some of them are: Water (95%), Urea, Ions, Proteins, Sugar, Nitrite, Ketone, Bilirubin, Urobilinogen, Red and White Blood Cells, Creatinine, Bacteria, Epithelial cells, etc. Size of components found in urine are provided in Table 1.

TABLE 1

| | |
|---|---|
| Na+ | 0.102 nm (radius) |
| K+ | 0.138 nm (radius) |
| Water Molecule | 0.275 nm (diameter) |
| Cl- | 0.181 nm (radius) |
| Urea | 0.26 nm (angstroms) |
| Proteins | 2-3 nm |

A water molecule is around 0.275 nm in size and most proteins are above 3 nm. The membrane 4 can be designed so that portions of the fluid (for example water having a size of about 0.275 nm) passes through openings of the membrane 4 and that elements such as biomarkers cannot pass through openings of the membrane 4 (about 2-3 nm).

After first fluid 10 has contacted membrane 4, an optional second fluid can contact the membrane 4, and at least a portion of that second fluid may pass through membrane 4. The second fluid can contain one or more second antibodies 13 (as shown in FIG. 1C) that are capable of also binding to the one or more biomarkers 5 of the complex 11. Second fluid can be any compatible physiological solution, such as but not limited to phosphate buffered saline and tris buffered saline, which is capable of preserving the structure and function of the one or more second antibodies 13.

On to the one or more second antibodies 13 can optionally be one or more labels. The one or more labels can be attached in any suitable way to second antibodies 13, such as being absorbed, being conjugated or linked to second antibodies 13. After the second fluid contacts membrane 4, the one or more second antibodies 13 binds to the one or more biomarkers 5 of complex 11. The one or more labels that are absorbed on to the one or more second antibodies 13 are therefore attached to membrane 4. The one or more labels can be any label that is suitable for absorption onto the one or more second antibodies 13 and that is able to change the appearance of the membrane 4, such as by a change in color of the membrane 4 in a region that is coated with the one or more antibodies 3. A non-limiting list of possible labels includes colloidal gold particles, latex particles, single-walled carbon nanotubes (SWCNT), europium particles, terbium particles, samarium particles, dysprosium particles, Alexa Fluor® dyes, Qdots®, R-phycoerythrin (R-PE), biotin or any suitable fluorophore.

Prior to the second fluid contacting membrane 4, an optional third fluid can contact membrane 4. This third fluid can contact membrane 4 and aid in removing any proteins that are nonspecifically contacting membrane 4. Nonspecific proteins include other biomarkers other than biomarkers that are capable of binding with the one or more antibodies 3.

The method of using device 1 of the first embodiment is now described.

Initially, an amount of a fluid 10 is collected and is then placed in contact with membrane 4 in upper container 8, and at least a portion of fluid 10 passes through membrane 4. The membrane 4 includes one or more antibodies 3 that are capable of binding to the one or more biomarkers 5 in fluid 10. Fluid 10 and membrane 4 can be in contact, as the fluid 10 is passing through membrane 4, for any suitable amount of time, such as, for example, between about 1 second and about 10 minutes, or about 1 minute and about 20 minutes, to create a complex 11 between the one or more biomarkers 5 of the fluid 10 and the one or more antibodies 3 of the membrane 4.

After fluid 10 contacts membrane 4, the membrane 4 can then optionally be contacted with a second fluid, which contains one or more second antibodies 13. The one or more second antibodies 13 can bind to the complex 11 after contact with membrane 4. The one or more second antibodies 13 can be absorbed to one or more labels, which can be used to identify the binding of the one or more antibodies 3 and one or more second antibodies 13 to the one or more biomarkers 5. Second fluid and membrane 4 can be in contact for any suitable amount of time, such as, for example, between about 1 second and about 10 minutes, or about 1 minute and about 20 minutes.

As an optional step, prior to contact with the second fluid, membrane 4 can be contacted with a third fluid that is capable of removing biomarkers or other proteins that do not bind to the one or more antibodies 3. Third fluid and membrane 4 can be in contact for any suitable amount of time, such as, for example, between about 1 second and about 10 minutes.

As another optional step, after removal of membrane 4 from the second fluid, the amount of the one or more labels on membrane 4 can be quantified. For example, if the one or more labels were fluorescent labels, membrane 4 could be quantified in a fluorescent intensity reader to determine the concentration of label or labels present.

Further embodiments of the device are discussed below in reference to FIGS. 2-10.

Figure 2:
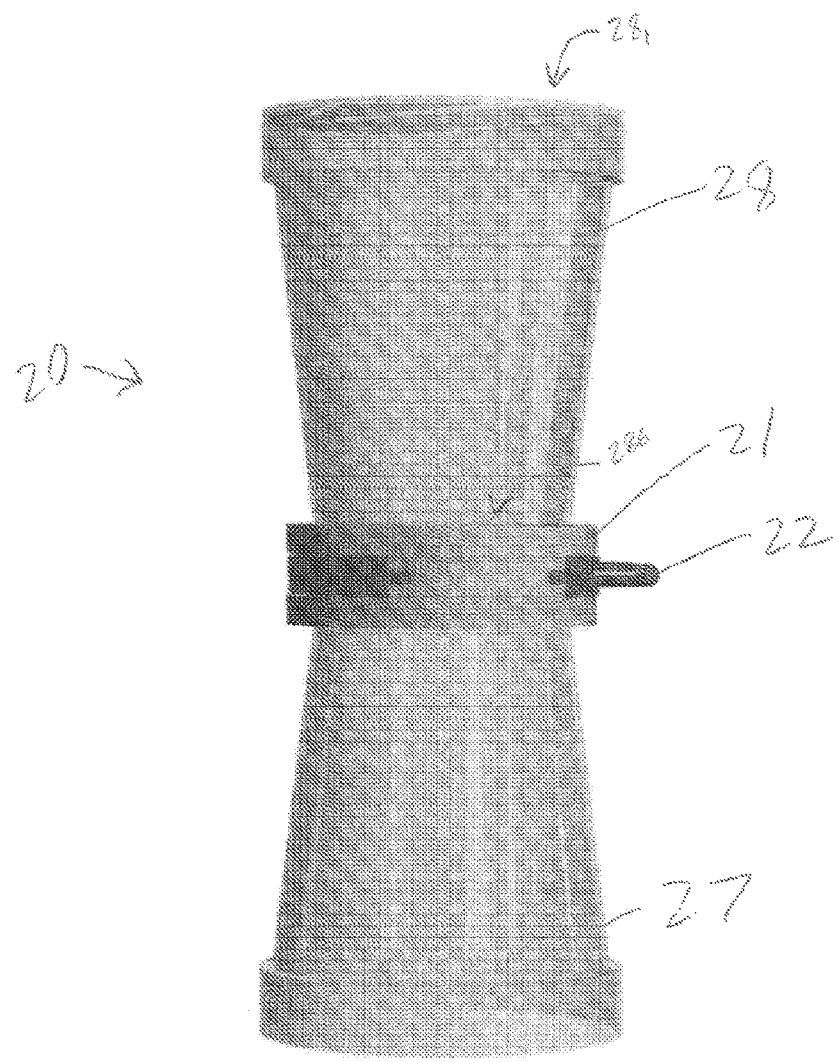
FIG. 2 is an illustration of another embodiment of the disclosed device.

In FIG. 2, a device 20 is shown that includes an upper container 28 and a lower container 27, shown as being attached to one another through a linking member 21. The upper container has a first opening 28a, which may or may not be sealed by a cover or the like, and a second opening 28b which can attach to a linking member 21. Fluid can be added to device 20 through the first opening 28a.

Each of upper container 28 and lower container 27 are attached to the linking member 21 in any suitable way, such as a thread and groove element, a snap fit and/or an adhesive.

Within the linking member 21, a membrane support 22 can be housed. This membrane support 22 can be placed within linking member 21 in a configuration so that a membrane (not shown) can be exposed to a fluid in upper container 28 as the fluid at least partially passes through the membrane into the lower container 27. The membrane support 22 cart be removed and replaced during a single use of the device 20, or removed and replaced for a subsequent use of the device 20.

Figure 3:
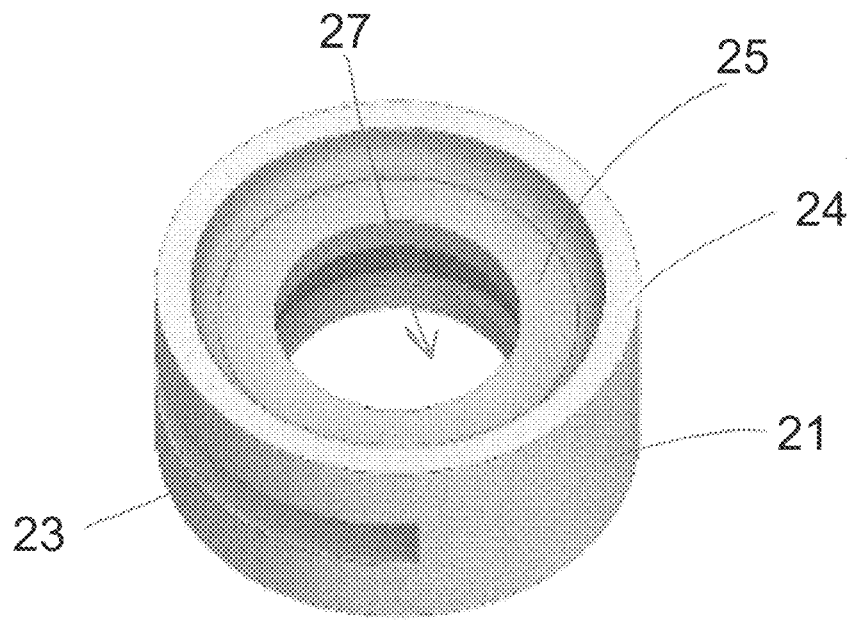
FIG. 3 is an illustration of a linking member of the disclosed device.

A more detailed view of linking member 21 is shown in FIG. 3, without the containers attached and without the membrane support present. In this view a membrane support slot 23A is shown, which is substantially parallel with an upper surface 24 of the linking member 21A. Membrane support slot 23A is so dimensioned as to attach to an upper container through at least partial contact with upper container face 25 (with membrane support slot 23A also being so dimensioned as to attach to an lower container through at least partial contact with a lower container face (not shown)) and to accept a membrane support with little or no liquid exiting through any portion of the linking member 21 as the fluid passes through linking member orifice 27.

Figure 4:
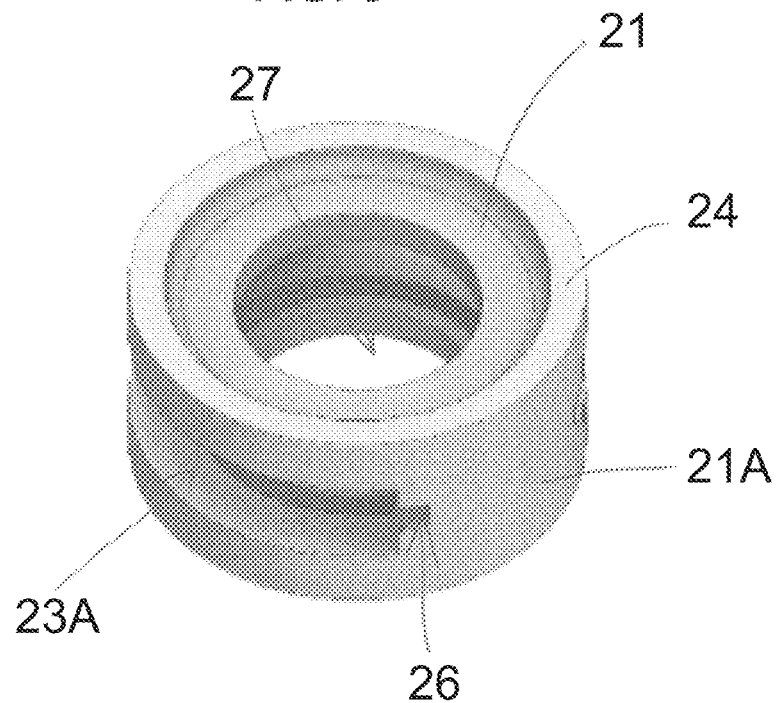
FIG. 4 is an illustration of another embodiment of a linking member of the disclosed device.

FIG. 4 illustrates a modified linking member 21A, having a modified membrane support slot 23A. Modified membrane support slot 23A includes a slot extension 26 to accept a portion of a membrane support.

Figure 5:
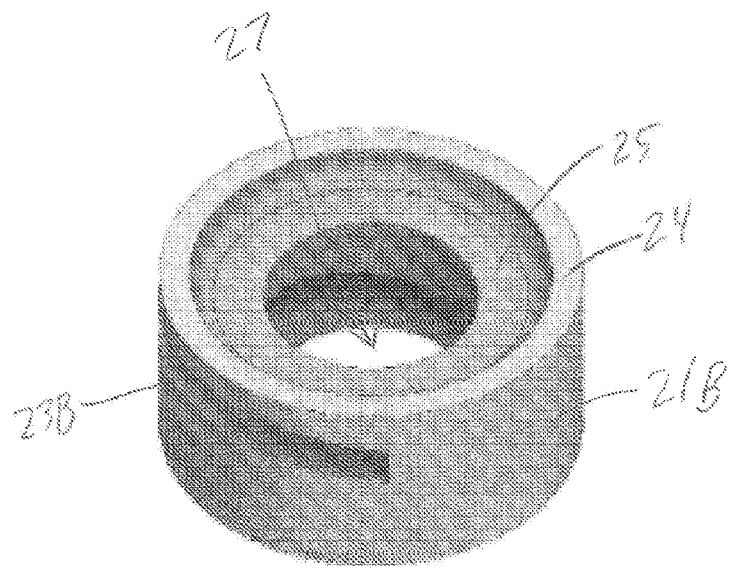
FIG. 5 is an illustration of another embodiment of a linking member of the disclosed device.

FIG. 5 illustrates a second modified linking member 21B, having an angled membrane support slot 23B. Angled membrane support slot 23B is angled at about 10° from about parallel with the upper surface 24. In other embodiments. Angled membrane support slot 23B can be angled at about 5°, about 15°, about 20°, about 25°, about 30°, about 35°, about 40° or about 45° from about parallel with the upper surface 24.

Figure 6:
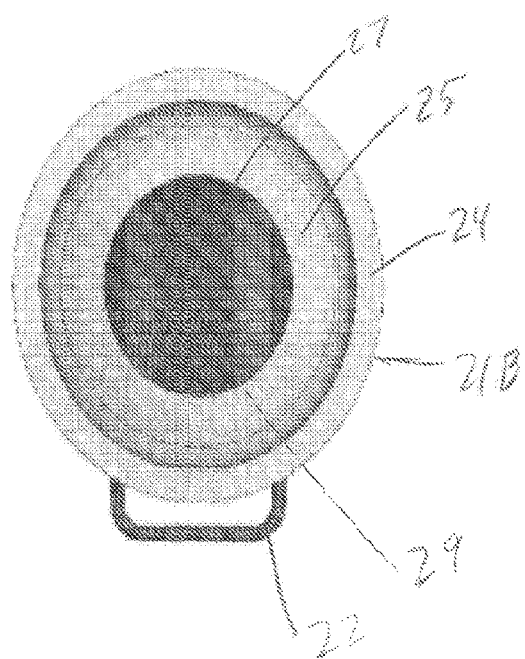
FIG. 6 is an illustration of another embodiment of a linking member of the disclosed device.

FIG. 6 illustrates a top view of second modified linking member 21B, having the membrane support 22 inserted therein. In this embodiment, a membrane 29 is visible through linking member orifice 27.

Figure 7:
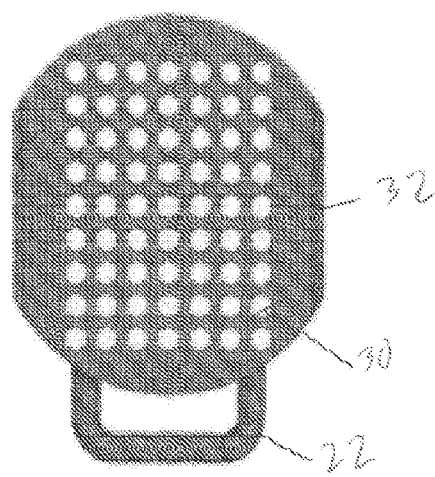
FIG. 7 is an illustration of a membrane support.

FIG. 7 illustrates a top view of one embodiment of membrane support 22, without a membrane, which includes a plurality of holes 30 in a membrane support upper surface 32. Membrane support upper surface 32 is configured to support a membrane.

Figure 8:
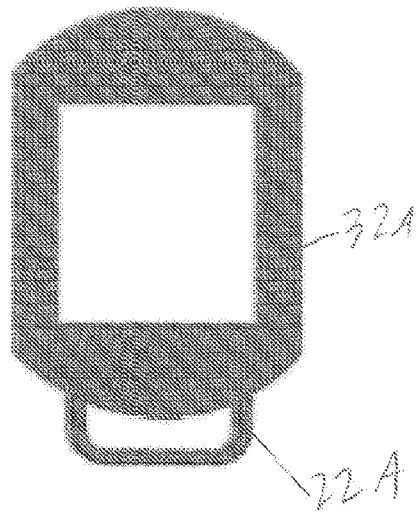
FIG. 8 is an illustration of another embodiment of a membrane support.

FIG. 8 illustrates a top view of an embodiment of a modified membrane support 22A, which includes one opening in a center region of a modified membrane support upper surface 32A. The modified membrane support upper surface 32A is configured to support a membrane.

Figure 9:
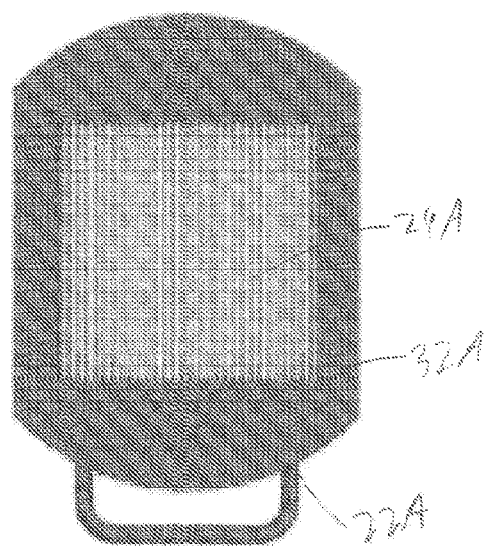
FIG. 9 is an illustration of another embodiment of a membrane support.

FIG. 9 illustrates a top view of an embodiment of the modified membrane support 22A, with a modified membrane 29A supported by the modified membrane support 22A.

Figure 10:
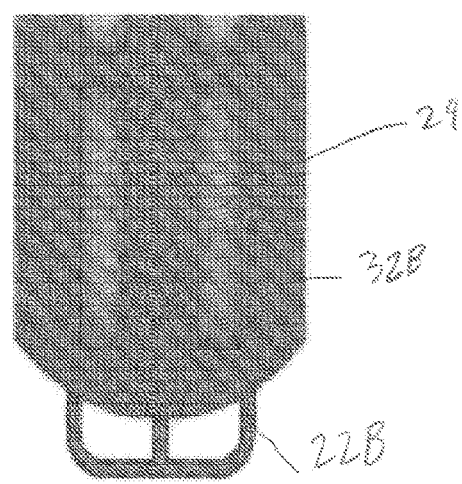
FIG. 10 is an illustration of another embodiment of a membrane support.

FIG. 10 illustrates a top view of an embodiment of a second modified membrane support 22B. The second modified membrane support 22B includes a second modified support upper surface 32B that includes openings to support the membrane 29.

Figure 11:
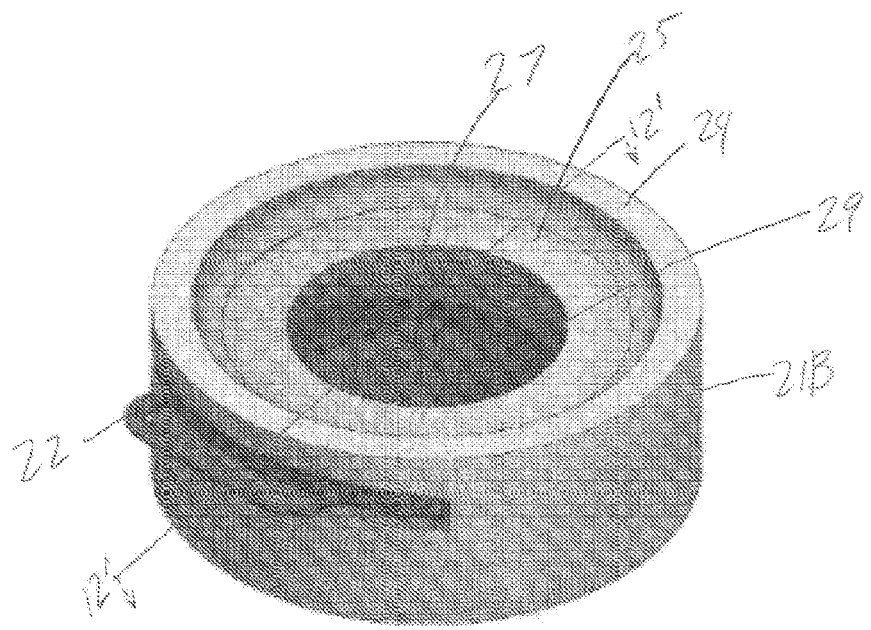
FIG. 11 is an illustration of another embodiment of a linking member of the disclosed device.

A perspective view of the second modified linking member 21B (also shown in FIG. 6), having the membrane support 22 inserted therein is shown in FIG. 11.

Figure 12:
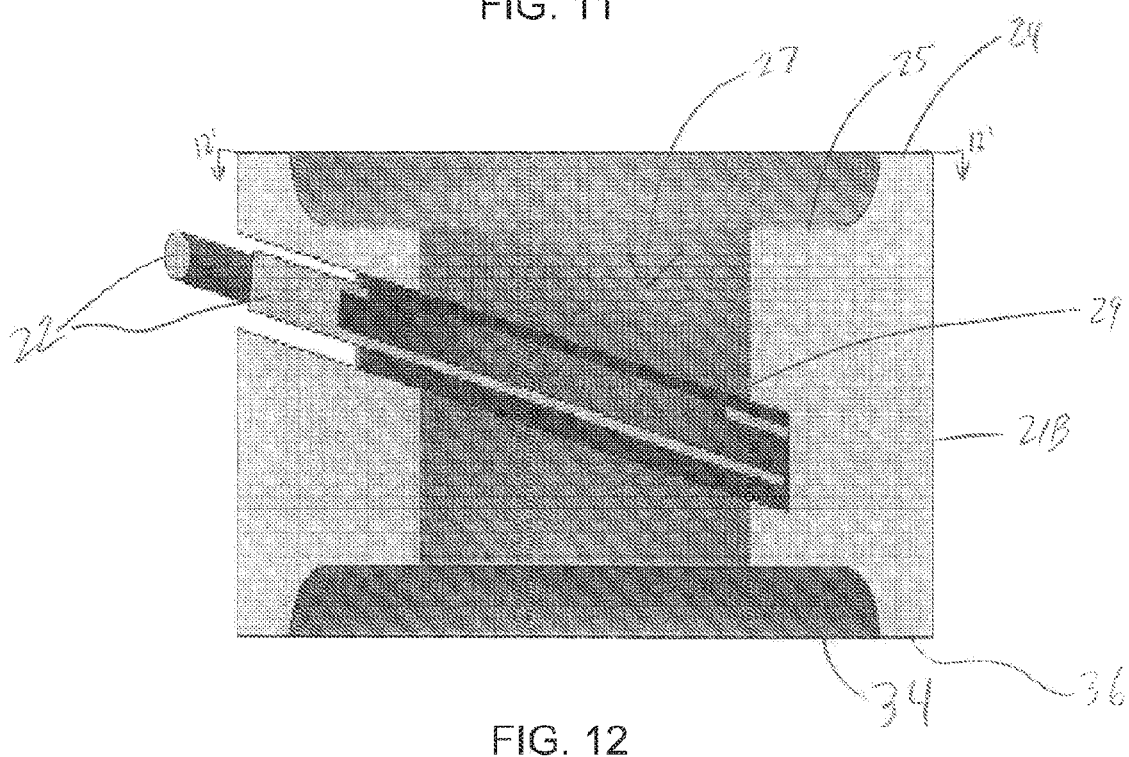
FIG. 12 is an illustration of a cross section of the linking member of FIG. 11.

FIG. 12 illustrates a cross sectional view of second modified linking member 21B along line 12' of FIG. 11. In FIG. 12, a fluid would past upper container face 25, through linking member orifice 27, contact membrane 29, at least a portion of the fluid passing through membrane 29, and toward a lower container face 34 (which is so dimensioned as to attach to a lower container through at least partial contact with lower container face 34) and a lower surface 36.

Figure 13:
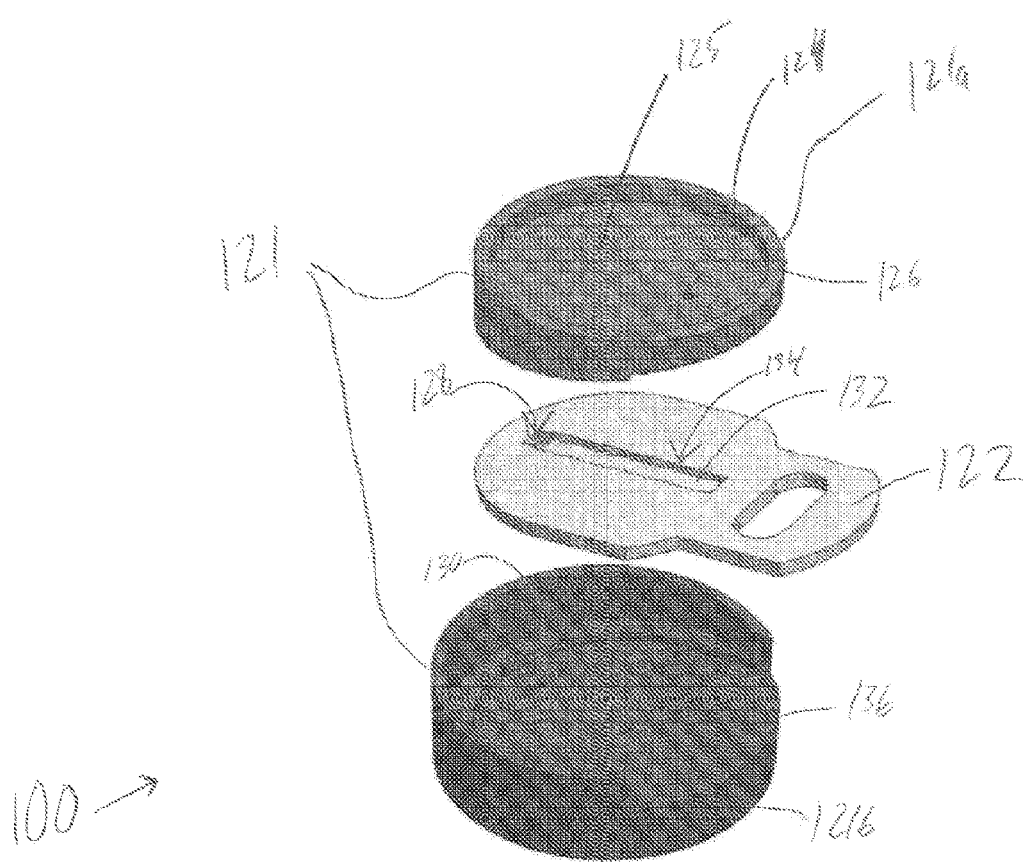
FIG. 13 is an illustration of another embodiment of a linking member of the disclosed device.

Another embodiment of a device 100 is shown in FIG. 13. Device 100 includes a linking member 121, which includes an upper portion 121a and a lower portion 121b. Although not shown, linking member 121 is dimensioned to operably attach to an upper container (not shown) by contact with one or both of an upper surface 124 and an upper container face 125. Although not shown, linking member 121 is dimensioned to operably attach to a lower container (not shown) by contact with one or both of a lower surface (not shown) and a lower container face (not shown).

Upper container face 125 includes an upper container face orifice 126 that is configured to allow at least a portion of a fluid in an upper container to pass therethrough. The diameter of the upper container face orifice 126 can be adjusted for varying flow rates, for example, about 0.5 mm, about 1 mm, about 1.5 mm, about 2 mm, about 2.5 mm or more.

Membrane support 122 can include a membrane support orifice 128, which is configured to allow at least a portion of a fluid that passes through the upper container face orifice 126 through the membrane support orifice 128. Membrane support 122 is also configured to fit within an open area created between the upper portion 121a and the lower portion 121b.

The lower portion 121b can include a lower portion upper face 136 having a lower portion orifice 130 that is configured to allow at least a portion of a fluid that passes through the membrane support orifice 128 through the lower portion orifice 130.

Between upper container face orifice 126 and membrane support orifice 128, membrane support 122 can include length of a strip 132 in a support channel. Similarly to membrane 29 discussed above, strip 132 can contain one or more antibodies configured to bind with one or more biomarkers in a fluid. In other embodiments, strip 132 can be any diagnostic strip or dipstick.

The angle of the lower portion upper face 136 can be angled at about 5°, about 10°, about 15°, about 20°, about 25°, about 30°, about 35°, about 40° or about 45° from about parallel with the upper container face 125. This angle of lower portion upper face 136 and the size of the upper container face orifice 126 can be adjusted to arrive at a desired flow rate of fluid from upper container face orifice 126, through strip 132, to membrane support orifice 128 to lower portion orifice 130 and into a bottom container. This flow rate can be any desired flow rate, such as about 1 mL/minute, about 5 mL/min, about 10 mL/min, about 15 mL/min, about 20 mL/min, about 25 mL/min, about 30 mL/min, about 35 mL/min, about 40 ml/min, about 45 mL/min, about 50 mL/min or greater. Based on the flow rate, the time for detection of biomarkers can be about 1 minute, about 2 minutes, about 5 minutes, about 10 minutes, about 15 minutes, about 20 minutes or more.

Figure 14:
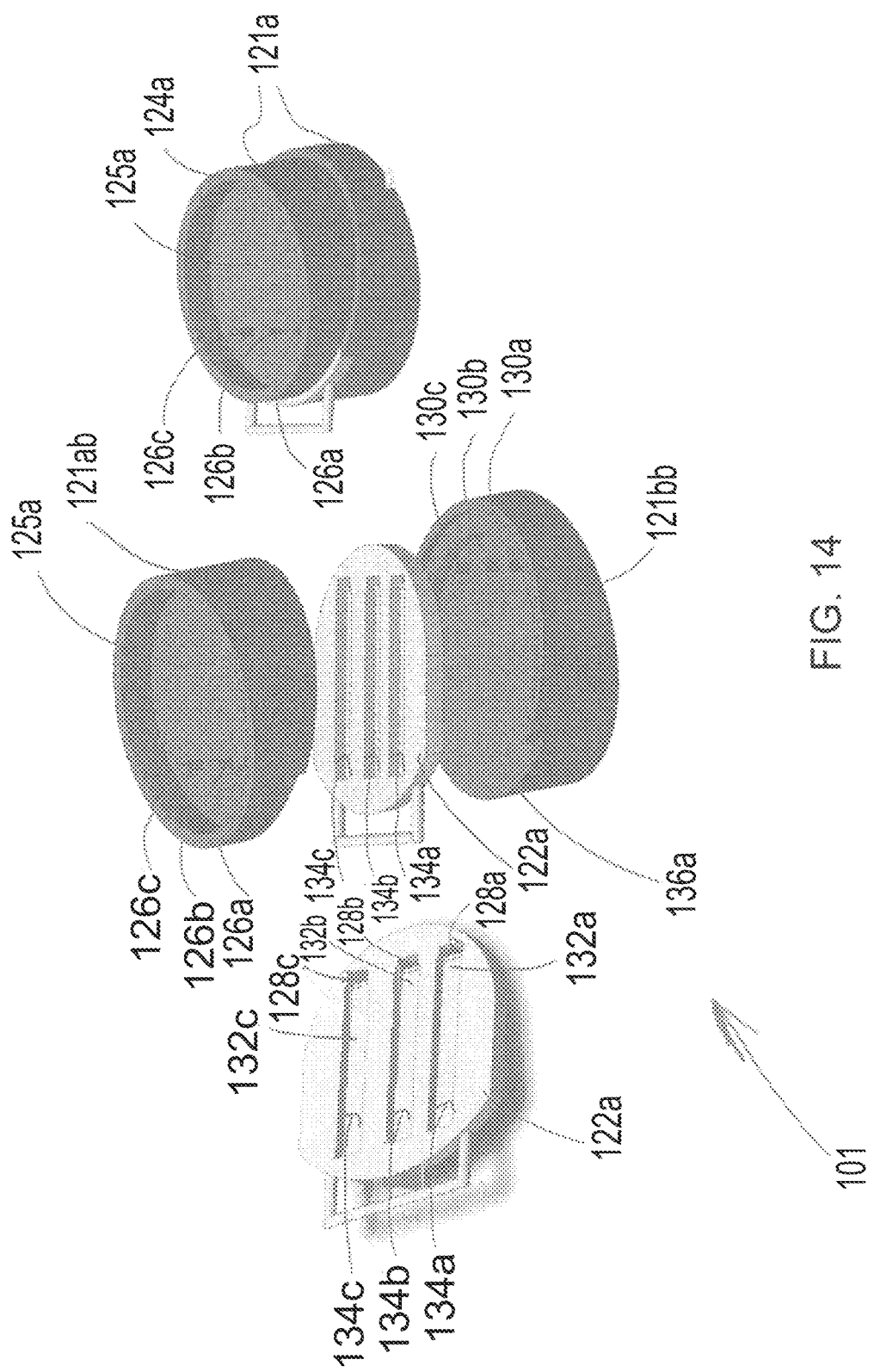
FIG. 14 is an illustration of another embodiment of a linking member of the disclosed device.

Another embodiment of a device 101 is shown in FIG. 14. Similarly to device 100, device 101 includes a linking member 121a, which includes an upper portion 121ab and a lower portion 121bb, but device 101 is a multiplex design, including three strips 134a, 134b and 134c, which can each measure the same or different biomarkers.

In device 101, an upper container face 125a includes three upper container face orifices 126a, 126b, and 126c and a membrane support 122a includes three strips 132a, 132b and 132c each within a support channel 134a, 134b and 134c, with each support channel including one of a membrane support orifice 128a, 128b and 128c.

A lower portion 121b includes three lower portion orifices 130a, 130b and 130c. As an example, fluid enters upper container orifice 126a, passes through strip 132a, through membrane support orifice 128a, through lower portion orifice 130a and into a bottom container. The fluid acts similarly for the b and c serialized elements in device 101.

The diameter of each of the upper container face orifices 126a, 126b and 126c can be adjusted for varying flow rates, for example, about 0.5 mm, about 1 mm, about 1.5 mm, about 2 mm, about 2.5 mm or more.

The angle of the lower portion upper face 136a can be angled at about 5°, about 10°, about 15°, about 20°, about 25°, about 30°, about 35°, about 40° or about 45° from about parallel with the upper container face 125a. This angle of lower portion upper face 136a and the size of each of the upper container face orifices 126a, 126b and 126c can be adjusted to arrive at a same or different desired flow rate of fluid from upper container face 125a to a lower container. This flow rate can be any desired flow rate, such as about 1 mL/minute, about 5 mL/min, about 10 mL/min, about 15 mL/min, about 20 ml/min, about 25 ml/min or greater. Based on the flow rate, the time for detection of biomarkers can be about 1 minute, about 2 minutes, about 5 minutes, about 10 minutes, about 15 minutes, about 20 minutes or more.

FIG. 15 illustrates a device 102, with the left image representing a cross section of device 102. Device 102 includes a linking member 121b, which includes a lower portion 121bc and an upper portion 121ac.

Device 102 is similar to device 100, but device 102 includes a lower portion upper face 136aa that is about parallel with an upper container face 125aa. Also, the 121bc includes a lower portion channel 138 that can receive a fluid from a membrane support orifice 128ab, and transmit that fluid to a lower portion orifice 130aa. Also, in device 102 after at least a portion of fluid from an upper container face 125aa passes through a lower portion orifice 130aa and into a lower container, a membrane support 122b can be removed and replaced with a new membrane support and the device 102 can be rotated about 180° so that the fluid in the lower container passes through a lower portion orifice 130aa, the lower portion channel 138, a membrane support orifice 128ab, and out an upper container orifice 126aa into an upper container.

Figure 16A:
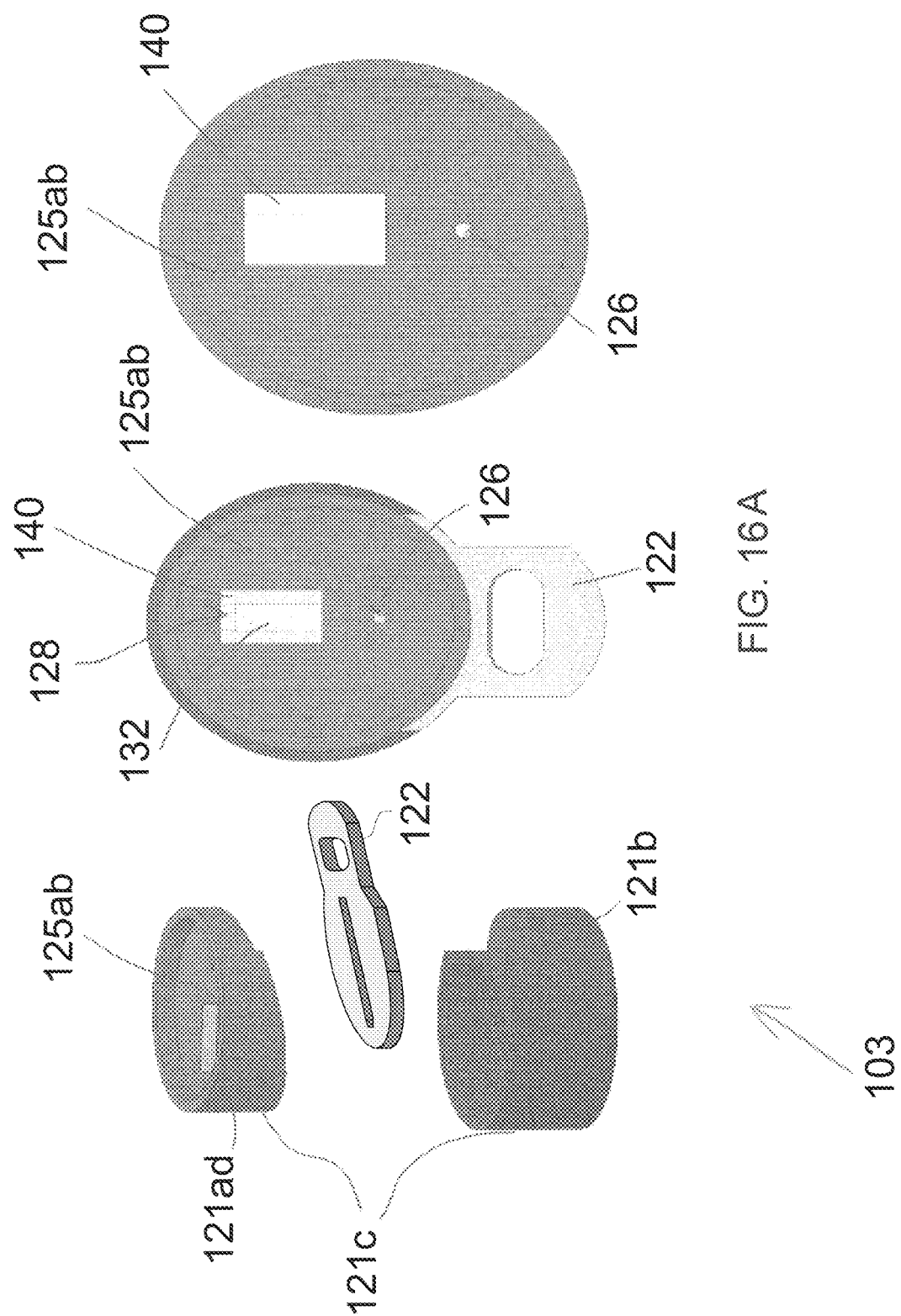
FIG. 16A is an illustration of another embodiment of a linking member of the disclosed device.

FIG. 16A illustrates a device 103, which is similar to device 100. Device 103 includes a linking member 121c, which includes a lower portion 121bc and an upper portion 121ad.

Figure 16B:
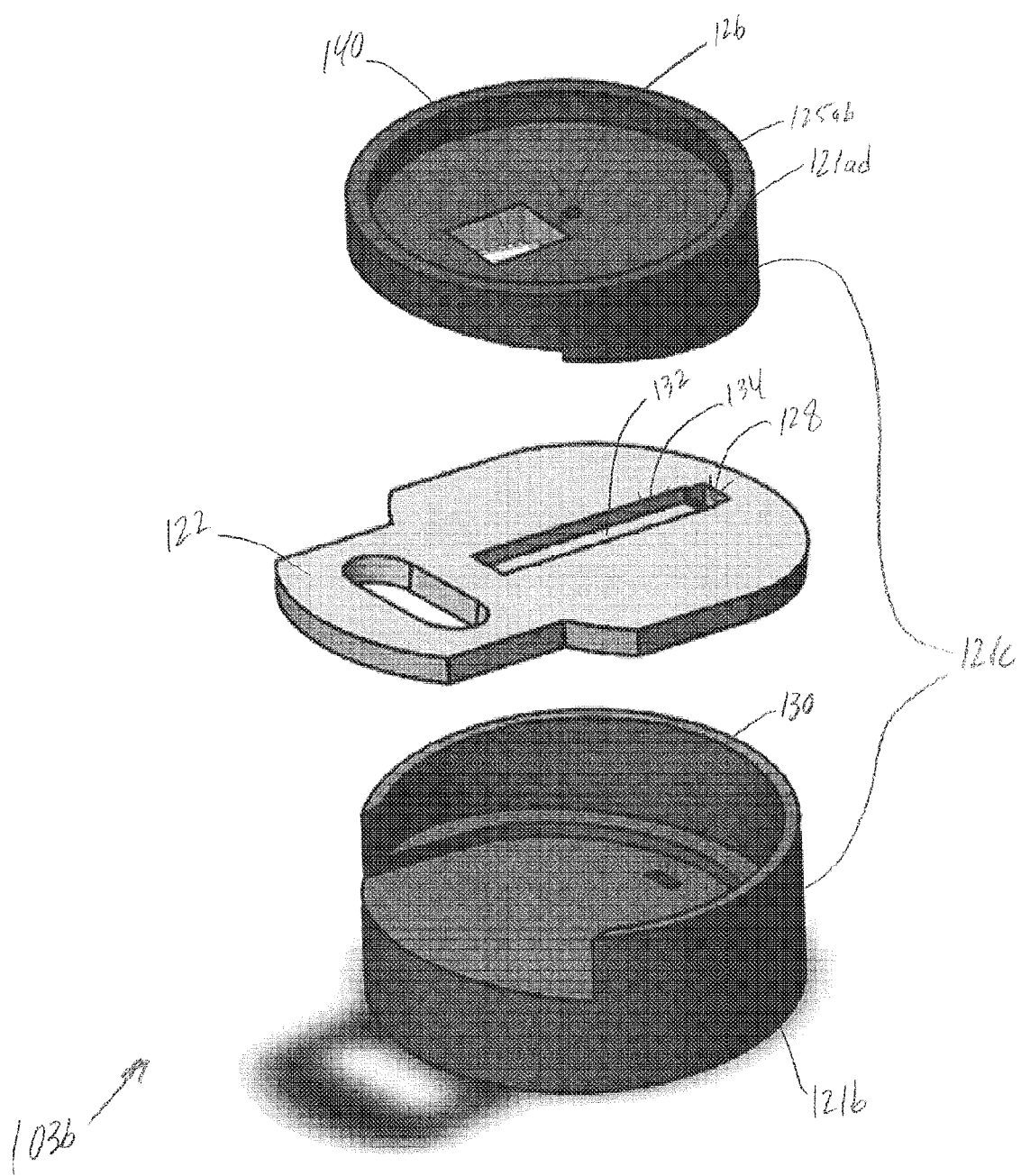
FIG. 16B is an illustration of another embodiment of a linking member of the disclosed device.

In device 103, the upper portion 121ad includes an upper container face 125ab, which includes an upper face viewing portion 140. Viewing portion 140 can be see-through or substantially see-through so that a strip 132 is visible therethrough. In this embodiment, upper container orifice 126 is further from the membrane support orifice 128 than the viewing portion 140. In other embodiments, the upper container orifice 126 can be nearer the membrane support orifice 128 than the viewing portion 140, such as shown in FIG. 16B.

Figure 17:
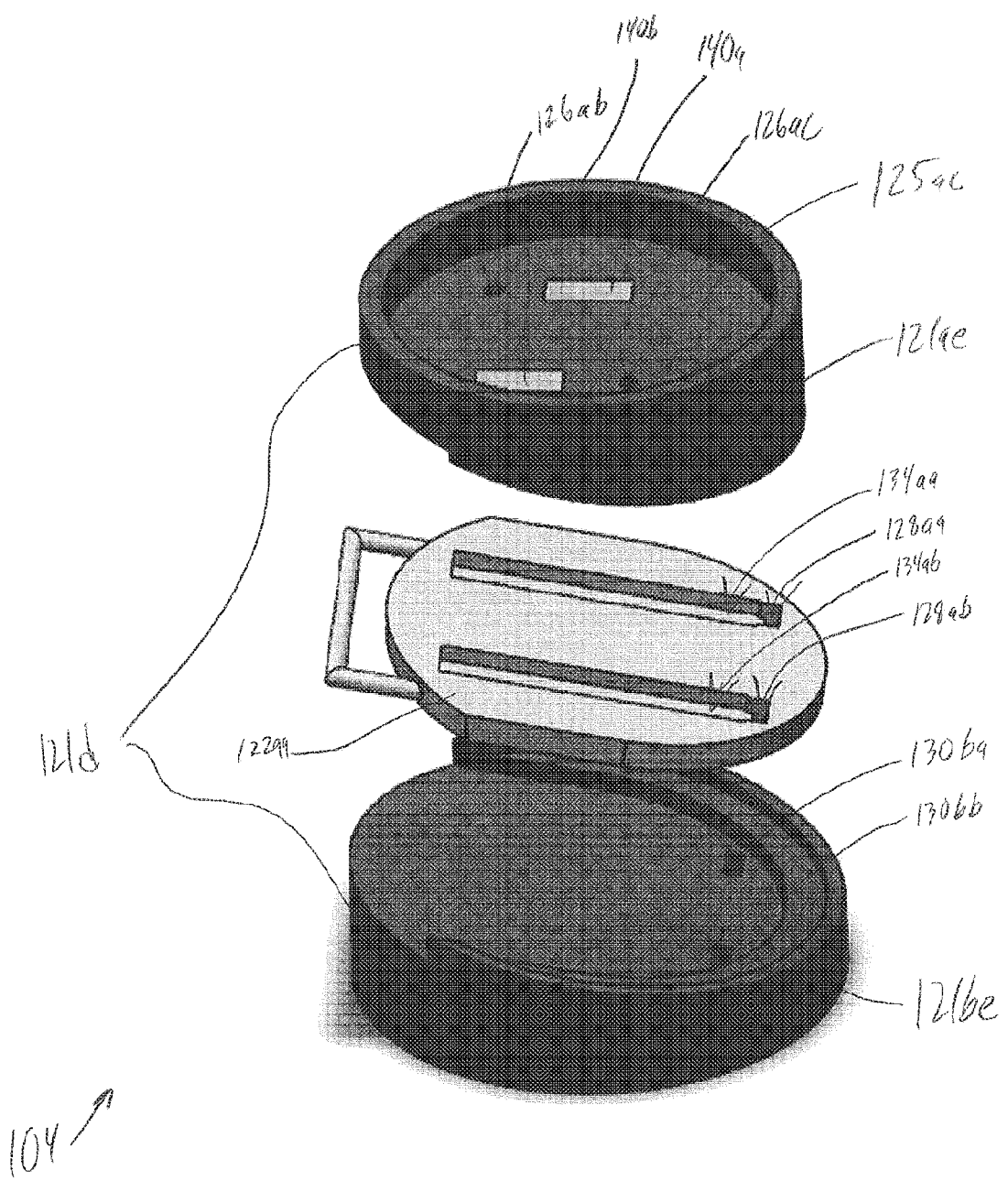
FIG. 17 is an illustration of another embodiment of a linking member of the disclosed device.

FIG. 17 illustrates a device 104. Device 104 includes a linking member 121d, which includes a lower portion 121be and an upper portion 121ae. The upper portion 121ae includes two upper container orifices 126ab and 126ac, as well as two viewing portions 140a and 140b. Also included in device 104 is a membrane support 122aa, having two support channels 134aa and 134ab, with corresponding membrane support orifices 128aa and 128ab.

Therefore, the path of a fluid contacting an upper container face 125ac is, in a first path from upper container orifice 126ab, through support channel 134aa, membrane support orifice 128aa and a lower portion orifice 130ba, and in a second path from upper container orifice 126ac, support channel 134ab, membrane support orifice 128ab and a lower portion orifice 130bb.

As can be seen one upper container orifice 126ab is further from membrane support orifice 128aa than the viewing portion 140a, while another upper container orifice 126ac is closer to membrane support orifice 128ab than the viewing portion 140b.

Any element of any of the above described devices can be formed of any suitable material. For example, elements can be formed of plastic materials, metal materials, naturally sourced materials, paper materials, glass materials, rubber materials, carbon based materials and mixtures thereof.

The methods and devices of the present disclosure will be better understood by reference to the following Examples, which are provided as exemplary of the disclosure and not by way of limitation.

Example 1

The presently disclosed device was tested for detecting trace biomarkers (considered to be less than about 1000 ng/mL concentration). Cotinine detection strips were placed in device 100. Cotinine is a metabolite of nicotine and people who smoke cigarettes will eliminate cotinine through urine (literature reports show that cotinine can accumulate in the blood within 5 minutes of cigarette smoking and will be eliminated through urine within 2-5 days). Device 100 was assembled with a cotinine detection strip (purchased from Craig Medical, Calif.) in the support channel (134 of FIG. 13).

Cotinine standard solution (400 ng/mL) was purchased from Sigma-Aldrich, Mo. Urine without cotinine and 400 ng/mL cotinine containing urine was passed through the device. The results were observed after about 5 minutes. The sample containing cotinine showed a positive band on the lateral flow cotinine strip.

Example 2

The following example was completed with a device 100 of FIG. 13. 3D printing technology was used to create models, with a CubePro 3D printer being used to print the linking member and the membrane support out of, for example, Acrylonitrile butadiene styrene (ABS) material. Urine collection cups were attached to the top and bottom of the linking member, as shown in FIG. 18A-18D.

Figure 18A:
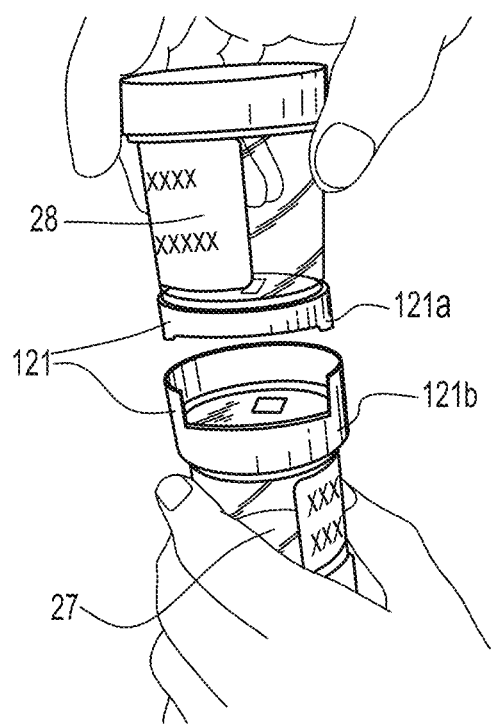
FIGS. 18A-18D are photographs of an embodiment of a linking member and operably attached containers.
Figure 18B:
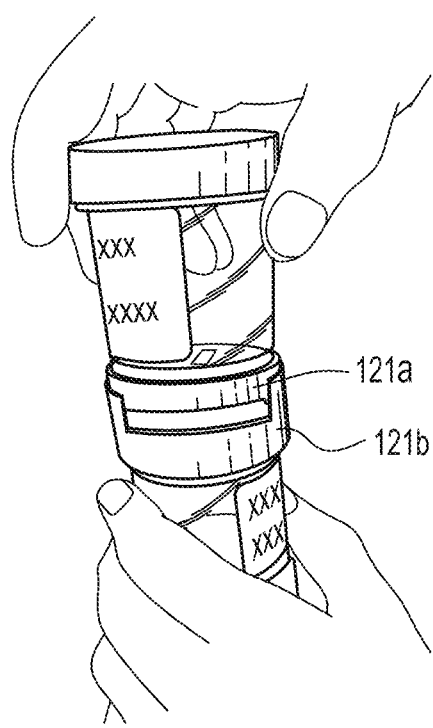
Figure 18C:
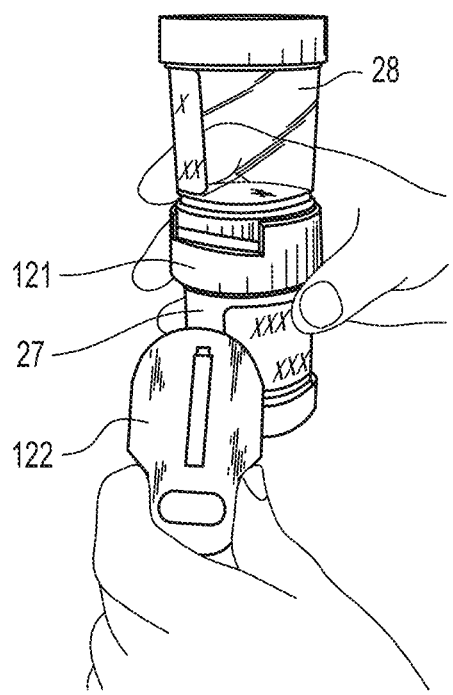

In FIG. 18A, the upper container 28 is operably attached to the upper portion 121a of linking member 121, and the lower container 27 is operably attached to the lower portion 121b. In FIG. 18B the upper portion 121a is operably connected to the lower portion 121b. In FIG. 18C the membrane support 22 can be included, and can contact the linking member 121 as shown in FIG. 18D.

Figure 18D:
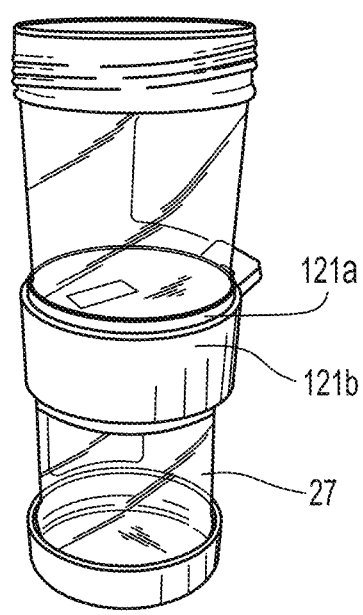

In FIG. 18D, the upper container face orifice 126 was 1 mm and a flow rate of fluid from the upper container 28 to the lower container 27 was about 50 ml, in about 5 minutes.

A pH detection strip 132 was added into the support channel 134. Solutions of normal (pH-7) and acidic (pH-2 by using HCl) were made and first the normal solution was poured into the upper container 128, the strip 132 was replaced with an unused strip 132 and the acidic solution was poured into the upper container 28. Once each solution passed onto the lower container 27, the membrane support was pulled out to see the change in color of the pH strip 132. A clear and accurate difference between the two solutions was shown on the pH strips.

Example 3

Figure 19A:
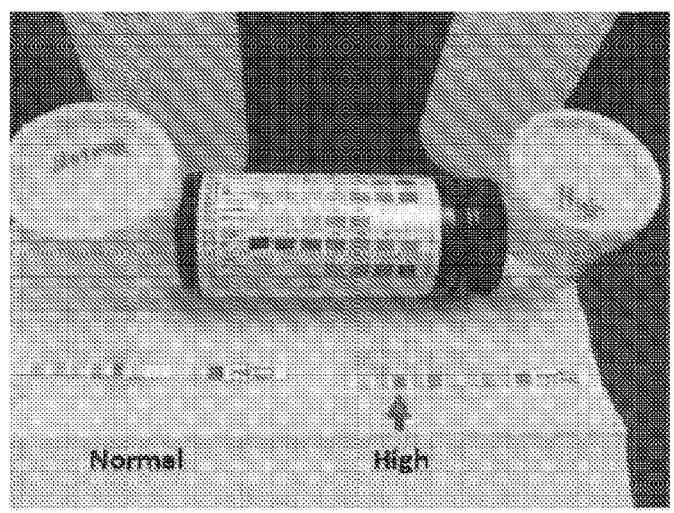
FIGS. 19A and 19B are photographs of used testing strips.

The traditional method of urinalysis, by inserting the dipsticks into simulated normal and high protein urine (purchased from Carolina Biological Supply, NC) was performed, with the results shown in FIG. 19a. High albumin in sample is detected by the change in color on the dipstick.

Figure 19B:
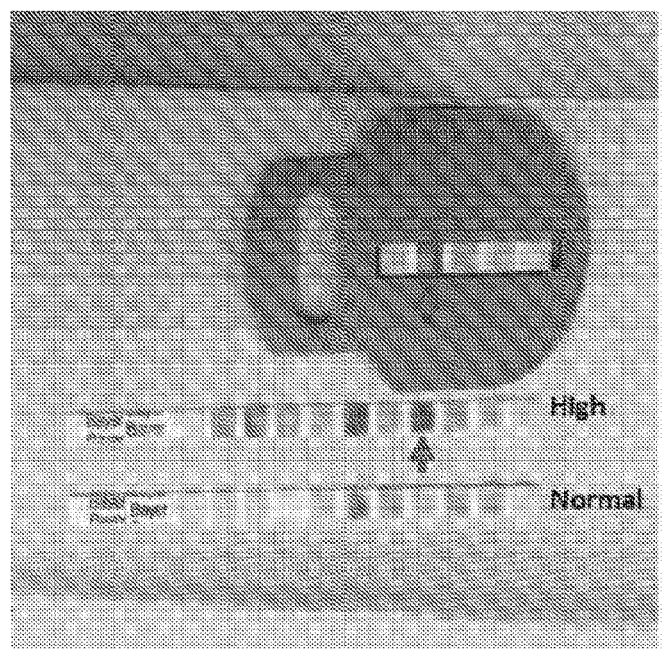

Using the same set up as Example 2, albumin level was detected by a urinalysis strip 132 of membrane support 22. Normal and high protein urine samples were analyzed by using the device (with results shown in FIG. 19b) and compared to the traditional analysis. The device 100 derived results are similar to those achieved by routine analysis, with the use of device 100 being more hygienic and sterile as compared to traditional urinalysis.

Example 4

The following example was completed with a device 103b of FIG. 16b.

Typical Human Chorionic Gonadotropin (HCG) biomarker detection devices (also known as home pregnancy tests) provide an indication of HCG presence above about 250 mIU/mL. The ability of devices of the present disclosure was determined to detect biomarkers at levels lower than about 250 mIU/mL, for instance, about 25 mIU/mL.

Clarity HCG detection strip 132 was placed in membrane support channel 134 in the linking member of FIG. 16B. Literature reports show that urine HCG is less than 100 mIU/ml in the first 4 weeks of pregnancy and hence is difficult to detect positive HCG presence using typical tests during this early time.

Figure 20:
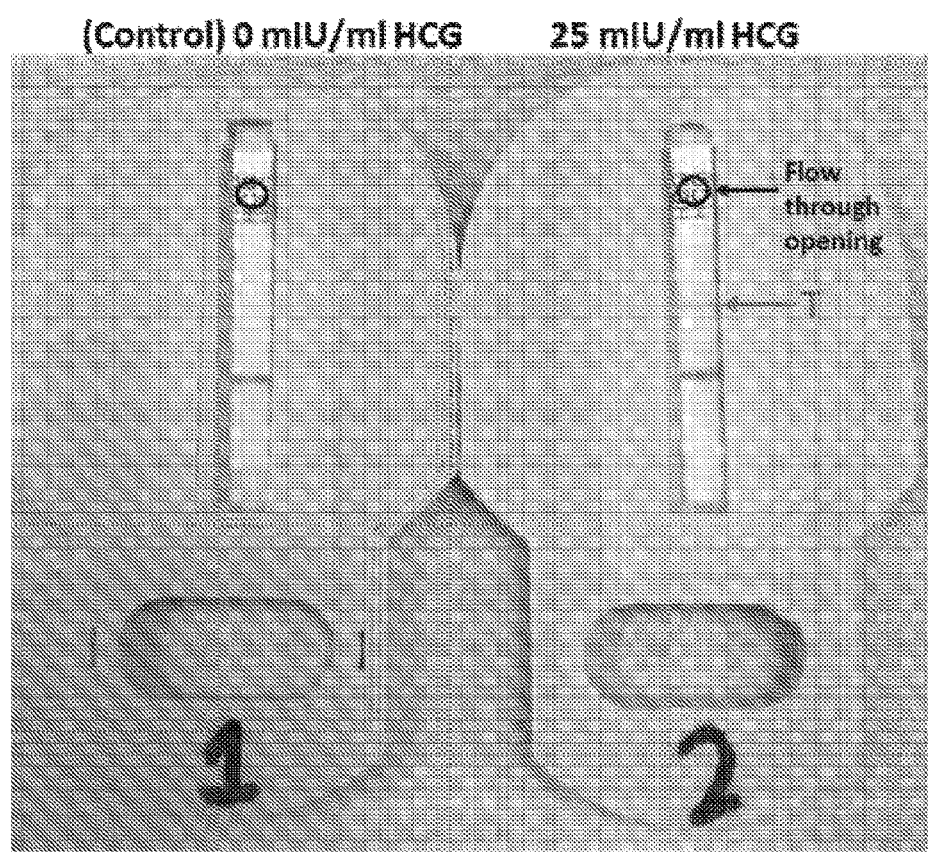
FIG. 20 is a photograph of used testing strips within membrane supports.

Normal urine was first passed through upper container face orifice 126, to contact strip 132. Strip 132, was then removed and replaced with an unused strip 132, and 25 miU/mL HCG containing urine was passed through upper container face orifice 126 to contact the strip 132. The results shown in FIG. 20 were observed in 5 minutes after the urine was passed through. The sample containing 25 mIU/mL HCG created a positive band (on the membrane support 122 numbered "2" in FIG. 20) the lateral flow strip 132. A commercially available Clarity Diagnostics hCG Single Step Urine Cassette Pregnancy Test was also tested as instructed by Clarity Diagnostics. The commercially available test provided a positive result for urine of a concentration of 250 mIU/mL HCG, but did not provide a positive result for urine of a concentration of 25 mIU/mL HCG.

One reason the present device can be used to detect such low levels is that is that every portion of the liquid to be tested (and all biomarkers therein) flow through the detection strip that is present in the membrane support, which allows for many markers to be confined to the detection strip.

Example 5

Many different biomarkers can be detected with the presently disclosed device. Below is a discussion of just some biomarkers that can be detected.

Detection of urine based disease/symptom biomarker detection is cumbersome and difficult due to the collection methods as well as the trace amounts of molecules that are to be detected. Over the years, biomarkers for diabetes associated kidney dysfunction, cancers, neurodegenerative diseases and even neuropsychiatric disorders have been identified and many of them are found to be in less than 1000 ng range. Some of these markers are shown in FIGS. 21-27.

In FIG. 23, urinary biomarkers of human neuropsychiatric disorders are listed, with MDD being major depressive disorder, BD being bipolar disorder and ASD being autism spectrum disorder.

In FIG. 24, urinary biomarkers of neurodegenerative diseases are listed, with AD being Alzheimer's disease, PD being Parkinson's disease, MScl being multiple sclerosis and TSEs being transmissible spongiform encephalopathies.

FIG. 25 is a list of the relative abundance classes of urine protein biomarkers.

FIGS. 26 and 27 are lists of markers, with urine proteins identified by LC-MS/MS in type 2 diabetic patients with macroalbuminuria. The identified proteins are listed with their SwissProt or TrEMBL accession numbers. Molecular weight (MW) is calculated using the CalPI/MW tool.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A device comprising:
    an upper container, the upper container configured to receive a fluid sample containing one or more biomarkers collected from a mammal into a first opening, the first opening opposite a second opening;
    a membrane, the membrane covering at least a portion of the second opening, the membrane configured to allow transmission of a portion of the fluid sample through the membrane;
    one or more antibodies bound to the membrane, the one or more antibodies configured to bind to the one or more biomarkers;
    a linking member, the linking member comprising a linking member orifice, an upper surface, a lower surface, a membrane support slot between the upper surface and the lower surface, and one or more of a thread and groove connection, a snap fit connection and an adhesive, wherein the one or more of the thread and groove connection, the snap fit connection and the adhesive are configured to maintain the upper container vertically above the linking member, and
    a membrane support, wherein the membrane support is dimensioned to fit within the membrane support slot, wherein the membrane support is configured to maintain the membrane within the membrane support slot, and wherein the membrane support is configured to be removed from the membrane support slot.

2. The device of claim 1, further comprising a lower container.

3. The device of claim 2, wherein the linking member comprises an upper portion and a lower portion.

4. The device of claim 3, wherein a membrane support of the linking member is configured to maintain the membrane.

5. The device of claim 3, wherein the membrane is maintained at an angle to an upper container face of the upper portion.

6. The device of claim 2, wherein the membrane is maintained within a membrane support of the linking member.

7. The device of claim 6, wherein the membrane support comprises a plurality of holes in a membrane support upper surface.

8. The device of claim 7, wherein the membrane support upper surface is configured to support the membrane.

9. The device of claim 6, wherein the membrane support comprises one opening in a center region of a membrane support upper surface.

10. The device of claim 9, wherein the membrane support upper surface is configured to support the membrane.

11. The device of claim 6, wherein the membrane support comprises a plurality of openings in a membrane support upper surface.

12. The device of claim 11, wherein the membrane support upper surface is configured to support the membrane.

13. The device of claim 2, wherein the membrane is maintained at an angle to an upper container face of the upper portion.

14. The device of claim 2, wherein the linking member comprises an upper container face that is configured to contact a fluid sample in the upper container.

15. The device of claim 2, wherein the linking member comprises an upper container face, wherein each of the linking member orifice and the upper container face extend over a portion of an upper portion of the linking member.

16. The device of claim 1, wherein the membrane is selected from the group consisting of a cellulose based membrane, a vinyl based membrane and a carbon based membrane.

17. The device of claim 16, wherein the cellulose based membrane is selected from the group consisting of a cellulose acetate, a regenerated cellulose membrane and a nitrocellulose.

18. The device of claim 16, wherein the vinyl based membrane is polyvinylidene fluoride (PVDF).

19. The device of claim 16, wherein the carbon based membrane is about a one atom thick graphene membrane.

20. The device of claim 1, wherein the membrane is a strip.

21. The device of claim 1, wherein openings of membrane comprises openings of a size selected from the group consisting of about 0.25 nm, about 0.5 nm, about 0.75 nm, about 1 nm, about 1.5 nm, about 2 nm, about 2.5 nm, about 3 nm, about 3.5 nm, about 4 nm, about 4.5 nm and about 5 nm.

22. The device of claim 1, wherein the membrane is configured to transmit a portion of the fluid sample through the membrane as a lateral flow transmission.

23. The device of claim 1, further comprising:
    one or more second antibodies configured to bind to the one or more biomarkers; and
    one or more labels attached to the one or more second antibodies.

24. The device of claim 23, wherein the one or more labels are configured to change a color of the membrane.

25. The device of claim 23, wherein the one or more labels are selected from the group consisting of colloidal gold particles, latex particles, single-walled carbon nanotubes (SWCNT), europium particles, terbium particles, samarium particles, dysprosium particles, R-phycoerythrin (R-PE), and biotin.

26. The device of claim 1, wherein the membrane support slot is at an angle of about 5° to about 45° from about parallel with the second opening.

\* \* \* \* \*